(12) United States Patent
Sato et al.

(10) Patent No.: US 11,938,717 B2
(45) Date of Patent: Mar. 26, 2024

(54) IMAGE RECORDING METHOD

(71) Applicant: FUJIFILM Corporation, Tokyo (JP)

(72) Inventors: Ayato Sato, Kanagawa (JP); Noriaki Maida, Kanagawa (JP); Hidetoshi Kawasaki, Kanagawa (JP); Takeshi Miyato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/736,658

(22) Filed: May 4, 2022

(65) Prior Publication Data

US 2022/0258495 A1 Aug. 18, 2022

Related U.S. Application Data

(63) Continuation of application No. PCT/JP2020/044305, filed on Nov. 27, 2020.

(30) Foreign Application Priority Data

Dec. 25, 2019 (JP) .................................. 2019-233942

(51) Int. Cl.
*B41J 11/00* (2006.01)
*B41M 7/00* (2006.01)

(52) U.S. Cl.
CPC ...... *B41J 11/0021* (2021.01); *B41J 11/00216* (2021.01); *B41M 7/0081* (2013.01)

(58) Field of Classification Search
CPC ..... C09D 11/322; C09D 11/40; C09D 11/101; C09D 11/30; C09D 11/32; B41J 2/2114; B41J 11/0015; B41J 11/0021; B41J 11/002; B41J 11/00216; B41J 2/01; B41M 5/0047; B41M 7/009; B41M 7/0027

See application file for complete search history.

(56) References Cited

U.S. PATENT DOCUMENTS

| | | | | |
|---|---|---|---|---|
| 8,690,312 | B2* | 4/2014 | Tombs | B41J 11/00214 347/102 |
| 9,420,698 | B2* | 8/2016 | Yoshi | H05K 3/1283 |
| 2003/0194524 | A1* | 10/2003 | Kwasny | B41M 7/0027 428/40.1 |
| 2010/0009136 | A1* | 1/2010 | Oyanagi | C09D 11/322 524/556 |
| 2010/0033527 | A1* | 2/2010 | Kawakami | B41M 5/52 347/16 |
| 2010/0045760 | A1 | 2/2010 | Kawakami et al. | |
| 2011/0074864 | A1 | 3/2011 | Yamada et al. | |
| 2013/0038668 | A1* | 2/2013 | Kaga | C09D 11/38 347/102 |
| 2014/0132684 | A1* | 5/2014 | Ohta | B41M 7/009 347/102 |
| 2015/0191031 | A1* | 7/2015 | Ohta | B41M 7/0036 428/207 |
| 2015/0197654 | A1* | 7/2015 | Okuda | C09D 11/54 524/88 |
| 2019/0047299 | A1 | 2/2019 | Matsumoto et al. | |

FOREIGN PATENT DOCUMENTS

| | | |
|---|---|---|
| JP | 2007-083510 A | 4/2007 |
| JP | 2007-331143 A | 12/2007 |
| JP | 2010-036455 A | 2/2010 |
| JP | 2010-069870 A | 4/2010 |
| JP | 2010-087287 A | 4/2010 |
| JP | 2010-125781 A | 6/2010 |
| JP | 2014-094495 A | 5/2014 |
| JP | 2015-074136 A | 4/2015 |
| JP | 2017-109485 A | 6/2017 |
| JP | 2019-151071 A | 9/2019 |
| WO | 2011/136009 A1 | 11/2011 |
| WO | 2017/138438 A1 | 8/2017 |
| WO | 2019/105867 A1 | 6/2019 |

OTHER PUBLICATIONS

Machine Translation of JP 2007-083510 A—Retrieved from Clarivate Analytics; Retrieved Mar. 2023. (Year: 2023).*
Machine Translation of JP-2010087287-A; Produced by Clarivate Analytics Sep. 18, 2023. (Year: 2023).*
International Search Report dated Feb. 16, 2021 from the International Searching Authority in International Application No. PCT/JP2020/044305.
Written Opinion dated Feb. 16, 2021 from the International Searching Authority in International Application No. PCT/JP2020/044305.
International Preliminary Report on Patentability with the translation of Written Opinion dated Jun. 28, 2022 from the International Bureau in International Application No. PCT/JP2020/044305.
Office Action dated Mar. 22, 2023 in Japanese Application No. 2021-567098.
Japanese Office Action dated Jun. 13, 2023, issued in Application No. 2021-567098.

* cited by examiner

*Primary Examiner* — John Zimmermann
(74) *Attorney, Agent, or Firm* — Sughrue Mion, PLLC

(57) ABSTRACT

An image recording method includes a step of preparing a first ink containing water and at least one selected from the group consisting of a chromatic colorant and a black colorant, a step of preparing a second ink containing a white colorant and water, an applying step of applying each of the first ink and the second ink onto a resin base material by an ink jet method, and a drying step of including irradiating the first ink and the second ink applied onto the resin base material with microwaves.

10 Claims, No Drawings

IMAGE RECORDING METHOD

CROSS-REFERENCE TO RELATED APPLICATIONS

This application is a Continuation of PCT International Application No. PCT/JP2020/044305 filed on Nov. 27, 2020, which claims priority under 35 U.S.C § 119(a) to Japanese Patent Application No. 2019-233942 filed on Dec. 25, 2019. Each of the above application(s) is hereby expressly incorporated by reference, in its entirety, into the present application.

BACKGROUND OF THE INVENTION

1. Field of the Invention

The present disclosure relates to an image recording method.

2. Description of the Related Art

In recent years, various research has been conducted on a technique of applying an ink using an ink jet method to record an image.

For example, JP2007-83510A discloses, as a compact device capable of forming a high-quality image without causing deformation of a recording medium, a photocurable ink jet recording device including an ultraviolet energy irradiation unit, an ink jet head that jets an ink curable by ultraviolet energy radiated by the ultraviolet energy irradiation unit to a recording medium based on an image signal, and a recording medium transport unit that transports the recording medium to a position facing the ink jet head, in which a microwave heating device heating the ink jetted onto the recording medium is provided.

JP2010-69870A discloses, as an ink jet recording method of obtaining a high-density image in which occurrence of color difference (color change) is suppressed, an ink jet recording method including a transport step of transporting an ink jet receiving layer having, on a support, an ink receiving layer that contains inorganic fine particles, a water-soluble resin, and a crosslinking agent, an ink jetting step of jetting an ink which contains a dye, water, and a water-soluble organic solvent in which the change rate of the median pore size of the ink receiving layer before and after application of 6.6 g/m$^2$ of the ink to the ink receiving layer, measured by a mercury press-fitting method, is 13.0% or less and in which the content ratio of the water-soluble organic solvent in the entire water-soluble organic solvent is 40% by mass or greater, to the transported ink jet recording medium using an ink jet method, and a drying step of drying at least the ink on the ink jet recording medium. JP2010-69870A also discloses an aspect in which the drying step is performed by microwave heating.

JP2019-151071A discloses, as an ink jet image forming device that satisfies high productivity using a dielectric heating method and is capable of suppressing yellowing of an image, an image forming device including an ink containing a resin and a pigment, an ink jet head jetting the ink, and a dielectric heating unit heating the ink, in which the resin contains a hydrophilic group and a hydrophobic group, and the conductivity of the ink at an evaporation rate of 80% is 0.010 S/m or less. JP2019-151071A also discloses an aspect in which the dielectric heating unit is a microwave heating unit.

SUMMARY OF THE INVENTION

Meanwhile, in image recording in an aspect where two or more kinds of inks are applied onto a resin base material by an ink jet method and the two or more kinds of the applied inks are dried to record an image, the drying properties of the two or more kind of inks applied onto a resin base material are insufficient and/or the uniformity of the drying properties between the two or more kinds of inks is degraded (that is, a difference in drying properties between the two or more kinds of inks is significant) in some cases.

Further, in a case where the drying temperature is increased in order to solve such problems, the resin base material may be deformed.

An object of one aspect of the present disclosure is to provide an image recording method in which drying properties of two or more kinds of inks applied onto a resin base material are excellent, the uniformity of the drying properties between the two or more kinds of inks is excellent, and deformation of the resin base material is suppressed.

Specific means for achieving the above-described objects includes the following aspects.

<1> An image recording method comprising: a step of preparing a first ink containing water and at least one selected from the group consisting of a chromatic colorant and a black colorant; a step of preparing a second ink containing a white colorant and water; an applying step of applying each of the first ink and the second ink onto a resin base material by an ink jet method; and a drying step of including irradiating the first ink and the second ink applied onto the resin base material with microwaves.

<2> The image recording method according to <1>, in which the drying step further includes blowing warm air at 40° C. to 100° C. to the first ink and the second ink applied onto the resin base material.

<3> The image recording method according to <1> or <2>, in which an irradiation amount of the microwaves in the drying step is in a range of 10 kWs to 300 kWs.

<4> The image recording method according to any one of <1> to <3>, in which the applying step is a step of applying the first ink and the second ink onto the resin base material in a disposition where an overlapping region is generated.

<5> The image recording method according to <4>, in which a total application amount of the first ink and the second ink in the applying step is 16 g/m$^2$ or greater.

<6> The image recording method according to <4> or <5>, in which a total application amount of the first ink and the second ink in the applying step is 25 g/m$^2$ or less.

<7> The image recording method according to any one of <4> to <6>, in which a ratio of an application amount of the second ink to an application amount of the first ink in the applying step is 0.6 or greater in terms of mass.

<8> The image recording method according to any one of <4> to <7>, in which a ratio of an application amount of the second ink to an application amount of the first ink in the applying step is 1.5 or less in terms of mass.

<9> The image recording method according to any one of <4> to <8>, in which an application amount of the second ink in the applying step is 7 g/m$^2$ or greater.

<10> The image recording method according to any one of <4> to <9>, in which an application amount of the second ink in the applying step is 15 g/m$^2$ or less.

<11> The image recording method according to any one of <1> to <10>, in which in the applying step, the first ink is applied onto the resin base material, and the second ink is applied onto at least a part of the applied first ink.

According to one aspect of the present disclosure, it is possible to provide an image recording method in which drying properties of two or more kinds of inks applied onto a resin base material are excellent, the uniformity of the drying properties between the two or more kinds of inks is excellent, and deformation of the resin base material is suppressed.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, "image" denotes an entire film to be formed by sequentially applying a pretreatment liquid, a first ink, and a second ink onto a resin base material, and "recording of an image" and "image recording" respectively denote formation of a film and film formation.

Further, the concept of "image" in the present disclosure also includes a solid image.

[Image Recording Method]

An image recording method of the present disclosure includes a step of preparing a first ink containing water and at least one selected from the group consisting of a chromatic colorant and a black colorant; a step of preparing a second ink containing a white colorant and water; an applying step of applying each of the first ink and the second ink onto a resin base material by an ink jet method; and a drying step of drying the first ink and the second ink applied onto the resin base material to obtain an image and irradiating the first ink and the second ink applied onto the resin base material with microwaves.

That is, an image recording method includes preparing a first ink containing water and at least one selected from the group consisting of a chromatic colorant and a black colorant; preparing a second ink containing a white colorant and water; applying each of the first ink and the second ink onto a resin base material by an ink jet method; and drying the first ink and the second ink applied onto the resin base material with irradiating microwaves.

The image recording method of the present disclosure may include other steps as necessary.

According to the image recording method of the present disclosure, drying properties of two or more kinds of inks applied onto a resin base material are excellent, the uniformity of the drying properties between the two or more kinds of inks is excellent (that is, a difference in drying properties between the two or more kinds of inks is decreased), and deformation of the resin base material is suppressed.

Hereinafter, the above-described effects will be described in more detail.

Generally, in image recording in an aspect where each of the first ink and the second ink is applied onto a resin base material by an ink jet method and the applied first ink and the second ink are dried to obtain an image, in a case where the first ink and the second ink are dried only by irradiation of infrared rays (hereinafter, also referred to as "infrared drying"), the drying properties of the second ink tend to be more insufficient than the drying properties of the first ink and as a result, the uniformity of the drying properties between the first ink and the second ink tends to be decreased (that is, a difference in drying properties between the first ink and the second ink tends to be significant).

The reason why the drying properties of the second ink are insufficient is considered to be that the second ink containing a white colorant is unlikely to absorb infrared rays as compared with the first ink containing at least one selected from the group consisting of a chromatic colorant and a black colorant.

In a case where the first ink and the second ink are applied onto the resin base material in a disposition where an overlapping region is generated, the adhesiveness of the image to the resin base material (hereinafter, also simply referred to as "adhesiveness of the image") tends to be decreased due to a decrease in uniformity of the drying properties between the first ink and the second ink.

In the present disclosure, the "overlapping region" denotes a region where at least a part of the first ink overlaps with at least a part of the second ink in a case where the resin base material onto which the first ink and the second ink are applied is seen in a plan view.

Further, in the image recording of the aspect described above, the conditions for blowing warm air (for example, the temperature of warm air) tend to be greatly restricted in a case where the inks are dried only by blowing warm air (hereinafter, "warm air drying").

For example, in a case where the temperature of the warm air is extremely low, the first ink and/or the second ink tends to be insufficiently dried. Here, in a case where the first ink and the second ink are applied in a disposition where an overlapping region is generated, the first ink and/or the second ink (particularly the ink applied first as the lower layer) tend to be insufficiently dried, and thus the adhesiveness of the image tends to be decreased.

Further, in a case where the temperature of the warm air is extremely high, the deformation of the resin base material is significant in some cases.

In the image recording method of the present disclosure, since the drying step includes irradiating of the first ink and the second ink applied onto the resin base material with microwaves (hereinafter, also referred to as "microwave drying"), the insufficiency of the drying properties of the first ink and the second ink is improved, the uniformity of the drying properties between the first ink and the second ink is improved, and the deformation of the resin base material is suppressed.

The reason why the insufficiency of the drying properties of the first ink and the second ink is improved is considered to be that the first ink and the second ink can be efficiently heated by microwave drying.

The reason why the uniformity of the drying properties between the first ink and the second ink is improved is considered to be that a difference in absorbability of microwaves between the first ink and the second ink is smaller than a difference in absorbability of infrared rays between the first ink and the second ink.

The reason why the deformation of the resin base material is suppressed is considered to be that the first ink and the second ink can be efficiently dried by microwave drying without extremely increasing the temperature of the resin base material.

Hereinafter, each step that can be included in the image recording method of the present disclosure will be described.

<Step of Preparing First Ink>

In the step of preparing the first ink (hereinafter, also referred to as "first ink preparing step"), the first ink containing a chromatic or black colorant and water is prepared.

The first ink preparing step may be a step of simply preparing the first ink that has been produced in advance or a step of producing the first ink.

A method of producing the first ink is not particularly limited, and a known method of mixing components can be employed.

The concept of the image recording method of the present disclosure includes an aspect in which two or more kinds of first inks are prepared in the first ink preparing step and the two or more kinds of prepared first inks are applied onto the resin base material in the following applying step in addition to an aspect in which one kind of first ink is prepared in the first ink preparing step and the one kind of prepared first ink is applied onto the resin base material in the following applying step.

The two or more kinds of first inks may be a combination of a first ink containing a chromatic colorant and water and a first ink containing a black colorant and water.

Specific examples of the aspect of the two or more kinds of first inks include three kinds of inks consisting of a cyan ink, a magenta ink, and a yellow ink; four kinds of inks consisting of a cyan ink, a magenta ink, a yellow ink, and a black ink; and five or more kinds of inks consisting of the above-described four kinds of inks and an ink of a different color other than cyan, magenta, yellow, and black.

(Water)

The first ink contains water.

The content of water is preferably 30% by mass or greater, more preferably 40% by mass or greater, and still more preferably 50% by mass or greater with respect to the total amount of the first ink.

The upper limit of the content of water depends on the amount of other components, but is preferably 90% by mass or less and more preferably 80% by mass or less with respect to the total amount of the first ink.

(Chromatic Colorant and Black Colorant)

The first ink contains at least one selected from the group consisting of chromatic colorants and black colorants.

The first ink may contain at least one kind of chromatic colorant and at least one kind of black colorant.

The chromatic colorant and the black colorant may be dyes or pigments, but pigments are preferable from the viewpoint of fastness and the like.

Examples of the chromatic colorant include an azo pigment, a polycyclic pigment (such as a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, or a quinophthalone pigment), a chelate dye, a nitro pigment, a nitroso pigment, iron oxide, barium yellow, cadmium red, and chromium yellow.

Examples of the chromatic color include cyan, magenta, yellow, blue, red, green, orange, and violet.

The chromatic colorant may be used alone or in combination of two or more kinds thereof.

Examples of the black colorant include carbon black and aniline black.

Further, the black colorant may be used alone or in combination of two or more kinds thereof.

The chromatic colorant and the black colorant may be appropriately selected from the pigments described in paragraphs 0096 to 0100 of JP2009-241586A.

The content of the chromatic colorant or the black colorant is preferably 50% by mass or greater, more preferably 70% by mass or greater, and still more preferably 90% by mass or greater with respect to the total amount of the colorant of the first ink.

It is preferable that the first ink contains substantially no white colorant. The content of the white colorant is preferably 10% by mass or less, more preferably 5% by mass or less, and still more preferably 2% by mass or less with respect to the total amount of the colorant of the first ink.

(Pigment Dispersion Resin)

The first ink in an aspect of containing a pigment may contain a pigment dispersion resin.

The first ink in this case contains a resin-coated pigment having a structure in which at least a part of the surface of the pigment is coated with the pigment dispersion resin.

A water-insoluble resin is preferable as the pigment dispersion resin.

An acrylic resin is preferable as the pigment dispersion resin.

Examples of the pigment dispersion resin include the pigment dispersion resins described in WO2013/180074A, JP5863600B, JP2018-28080A, JP2017-149906A, and JP2016-193981A. The pigment dispersion resin is also referred to as "resin dispersant" or the like.

Further, as a combination of the pigment and the pigment dispersion resin, for example, a resin-coated pigment coated with a pigment by a crosslinked water-soluble resin described in JP5404669B may be employed. The resin-coated pigment in this case can be prepared by, for example, using an acrylic resin containing a carboxy group as a water-soluble resin and a bifunctional or higher functional epoxy compound as a crosslinking agent.

In the present disclosure, the term "water-soluble" indicates a property in which 1 g or greater of a substance is dissolved in 100 g of water at 25° C. As the "water-soluble" property, a property in which 3 g or greater (more preferably 10 g or greater) of a substance is dissolved in 100 g of water at 25° C. is preferable.

In the present disclosure, the term "water-insoluble" indicates a property in which less than 1 g of a substance is dissolved in 100 g of water at 25° C. As the "water-insoluble" property, a property in which less than 0.5 g of a substance is dissolved in 100 g of water at 25° C. is preferable.

From the viewpoint of the adsorptivity to the pigment, the pigment dispersion resin has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornane ring structure, an isobornane ring structure, a norbornene ring structure, an isobornene ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the pigment dispersion resin.

From the viewpoint of the performance of dispersing the pigment, it is preferable that the pigment dispersion resin contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

From the viewpoints of the pigment dispersibility and the preservation stability, the acid value of the resin dispersant is preferably in a range of 30 mgKOH/g to 100 mgKOH/g, more preferably in a range of 30 mgKOH/g to 85 mgKOH/g, and still more preferably in a range of 50 mgKOH/g to 85 mgKOH/g.

Here, the acid value is defined as the mass (mg) of KOH required to completely neutralize 1 g of a resin and is measured by the method described in JIS standard (JIS K 0070, 1992).

The weight-average molecular weight (Mw) of the pigment dispersion resin is preferably 30000 or greater, more preferably in a range of 30000 to 150000, still more preferably in a range of 30000 to 100000, and even still more preferably in a range of 30000 to 80000.

In a case where the first ink contains the pigment dispersion resin, the content of the pigment dispersion resin is preferably in a range of 1% by mass to 25% by mass, more preferably in a range of 1% by mass to 20% by mass, still more preferably in a range of 1% by mass to 15% by mass, and even still more preferably in a range of 1% by mass to 10% by mass with respect to the total amount of the first ink.

In a case where the first ink contains the pigment dispersion resin, the ratio of the pigment dispersion resin (D) to the pigment (P) (that is, the D/P ratio) is preferably in a range of 0.05 to 3, more preferably in a range of 0.05 to 2, still more preferably in a range of 0.05 to 1, and even still more preferably in a range of 0.05 to 0.7.

(Resin Particles)

It is preferable that the first ink contains at least one kind of resin particles.

In a case where the first ink contains resin particles, the adhesiveness of the image to be recorded is further improved.

Here, the resin particles are distinguished from the pigment dispersion resin described above in terms that the particles consist of a resin.

A water-insoluble resin is preferable as the resin constituting the resin particles.

In a case where the first ink contains resin particles, an increase in viscosity of the first ink is further suppressed as compared with a case where the first ink contains the same mass of a water-soluble resin as the mass of the resin particles. As a result, the jettability (hereinafter, also simply referred to as "jettability of the ink") of the ink from an ink jet head in a case of using the ink as an inkjet ink is further improved.

The glass transition temperature of the resin particles (that is, the glass transition temperature of the resin in the resin particles) is not particularly limited.

From the viewpoint of further improving the strength of the image, the glass transition temperature (Tg) of the resin particles is preferably 20° C. or higher, more preferably 50° C. or higher, and still more preferably 80° C. or higher.

From the viewpoint of the manufacturing suitability of the resin particles, the glass transition temperature (Tg) of the resin particles is preferably 200° C. or lower, more preferably 150° C. or lower, and still more preferably 130° C. or lower.

As the resin particles, particles consisting of an acrylic resin (hereinafter, also referred to as acrylic resin particles), particles consisting of a polyester resin (hereinafter, also referred to as polyester resin particles), particles consisting of a polyurethane resin (hereinafter, also referred to as polyurethane resin particles), or particles consisting of a polyolefin resin (hereinafter, also referred to as polyolefin resin particles) are preferable.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

In the present disclosure, the polyester resin indicates a polymer compound having an ester bond in the main chain. Examples of the polyester resin include a polycondensate of polyvalent carboxylic acid (such as dicarboxylic acid) and polyalcohol (such as a diol).

In the present disclosure, the polyolefin resin indicates a polymer (a homopolymer or a copolymer) of a raw material monomer containing an olefin. Examples of the polyolefin resin include a polymer of one kind of olefin, a copolymer of two or more kinds of olefins, and a copolymer of one or more kinds of olefins and one or more kinds of other monomers. Examples of the olefin include an α-olefin having 2 to 30 carbon atoms.

In the present disclosure, the polyurethane resin indicates a polymer compound having a urethane bond.

From the viewpoint of further improving the adhesiveness and the rub resistance of the image, it is preferable that the resin particles which can be contained in the first ink include acrylic resin particles.

In a case where the resin particles contained in the first ink include acrylic resin particles, the proportion of the acrylic resin particles in the resin particles contained in the first ink is preferably 60% by mass or greater, more preferably 80% by mass or greater, and still more preferably 90% by mass or greater.

In a case where the proportion of the acrylic resin particles in the resin particles contained in the first ink is 60% by mass or greater, the adhesiveness of the image is further improved.

As the resin particles, self-dispersing resin particles are preferable.

Examples of the self-dispersing resin particles include self-dispersing polymer particles described in paragraphs 0062 to 0076 of JP2016-188345A and paragraphs 0109 to 0140 of WO2013/180074A.

The resin in the resin particles has preferably an alicyclic structure or an aromatic ring structure and more preferably an alicyclic structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornane ring structure, an isobornane ring structure, a norbornene ring structure, an isobornene ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of further improving the dispersibility of the resin particles in water, it is preferable that the resin contained in the resin particles contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

As the resin in resin particles, an acrylic resin having at least one selected from the group consisting of a benzyl (meth)acrylate unit, a phenoxyethyl (meth)acrylate unit, and an alicyclic structure-containing (meth)acrylate unit, and a (meth)acrylic acid unit is more preferable, and an acrylic resin having at least one selected from the group consisting of a benzyl (meth)acrylate unit, a phenoxyethyl (meth)acrylate unit, and an alicyclic structure-containing (meth)acrylate unit, a (meth)acrylic acid unit, and an alkyl (meth)acrylate unit that contains an alkyl group having 1 to 4 carbon atoms is still more preferable.

As the aliphatic structure-containing (meth)acrylate, at least one selected from alkyl (meth)acrylate containing a cycloalkyl group having 3 to 10 carbon atoms (such as cyclohexyl (meth)acrylate), isobornyl (meth)acrylate, adamantyl (meth)acrylate, and dicyclopentanyl (meth)acrylate is preferable, and at least one selected from isobornyl (meth)acrylate, adamantyl (meth)acrylate, and dicyclopentanyl (meth)acrylate is more preferable.

From the viewpoint of the self-dispersibility, the aggregating properties in a case of image recording, and the like, the acid value of the resin in the resin particles is preferably in a range of 25 mgKOH/g to 100 mgKOH/g, more preferably in a range of 30 mgKOH/g to 90 mgKOH/g, and still more preferably in a range of 35 mgKOH/g to 80 mgKOH/g.

The molecular weight of the resin in the resin particles is preferably in a range of 1000 to 300000, more preferably in a range of 2000 to 200000, and still more preferably in a range of 5000 to 100000 in terms of the weight-average molecular weight.

The weight-average molecular weight is measured by gel permeation chromatography (GPC). The details of GPC are as described above.

The volume average particle diameter of the resin particles is preferably in a range of 1 nm to 200 nm, more preferably in a range of 3 nm to 200 nm, and still more preferably in a range of 5 nm to 50 nm.

In a case where the first ink contains resin particles, the content of the resin particles is preferably in a range of 1% by mass to 25% by mass, more preferably in a range of 2% by mass to 20% by mass, still more preferably in a range of 2% by mass to 15% by mass, and even still more preferably in a range of 2% by mass to 10% by mass with respect to the total amount of the first ink.

(Water-Soluble Organic Solvent Having Boiling Point of Lower than 220° C.)

It is preferable that the first ink contains at least one water-soluble organic solvent having a boiling point of lower than 220° C.

In this manner, the lamination strength of the image recorded material is further improved.

In the present disclosure, the boiling point indicates a boiling point at 1 atm (101325 Pa).

Examples of the water-soluble organic solvent having a boiling point of lower than 220° C. include 1,2-propanediol (also referred to as propylene glycol; PG) (boiling point of 188° C.), 1,3-propanediol (boiling point of 213° C.), propylene glycol monomethyl ether (boiling point of 121° C.), ethylene glycol (boiling point of 197° C.), ethylene glycol monomethyl ether (boiling point of 124° C.), propylene glycol monoethyl ether (boiling point of 133° C.), ethylene glycol monoethyl ether (boiling point of 135° C.), propylene glycol monopropyl ether (boiling point of 149° C.), ethylene glycol monopropyl ether (boiling point of 151° C.), propylene glycol monobutyl ether (boiling point of 170° C.), ethylene glycol monobutyl ether (boiling point of 171° C.), 2-ethyl-1-hexanol (boiling point of 187° C.), dipropylene glycol monomethyl ether (boiling point of 188° C.), diethylene glycol dimethyl ether (boiling point of 162° C.), diethylene glycol diethyl ether (boiling point of 188° C.), and dipropylene glycol dimethyl ether (boiling point of 175° C.).

In a case where the first ink contains a water-soluble organic solvent having a boiling point of lower than 220° C., the content of the water-soluble organic solvent having a boiling point of lower than 220° C. is preferably in a range of 1% by mass to 50% by mass, more preferably in a range of 5% by mass to 40% by mass, still more preferably in a range of 10% by mass to 40% by mass, and even still more preferably in a range of 15% by mass to 35% by mass with respect to the total amount of the ink.

(Organic Solvent Having Boiling Point 220° C. or Higher)

The content of the organic solvent having a boiling point of 220° C. or higher (hereinafter, also referred to as "high-boiling point solvent") in the first ink is preferably 5% by mass or less. In this manner, the lamination strength of the image recorded material and the adhesiveness of the image are further improved.

Here, "the content of the organic solvent having a boiling point of 220° C. or higher in the first ink is 5% by mass or less" denotes that the first ink does not contain the organic solvent having a boiling point of 220° C. or higher (that is, the content of the organic solvent having a boiling point of 220° C. or higher in the first ink is 0% by mass) or even in a case where the first ink contains the organic solvent having a boiling point of 220° C. or higher, the content of the organic solvent having a boiling point of 220° C. or higher is 5% by mass or less with respect to the total amount of the first ink.

The content of the organic solvent having a boiling point of 220° C. or higher in the first ink is more preferably 3% by mass or less, still more preferably 2% by mass or less, even still more preferably 1% by mass or less, and even still more preferably 0% by mass.

The expression "the content of the organic solvent having a boiling point of 220° C. or higher in the second ink is 5% by mass or less" described below has the same meaning as "the content of the organic solvent having a boiling point of 220° C. or higher in the first ink is 5% by mass or less", and the preferable content of the high-boiling point solvent in the second ink is also the same as the preferable content of the high-boiling point solvent in the first ink.

Examples of the organic solvent having a boiling point of 220° C. or higher include glycerin (boiling point of 290° C.), 1,2-hexanediol (HDO) (boiling point of 223° C.), diethylene glycol (boiling point of 245° C.), diethylene glycol monobutyl ether (boiling point of 230° C.), triethylene glycol (boiling point of 285° C.), dipropylene glycol (boiling point of 232° C.), tripropylene glycol (boiling point 267° C.), trimethylolpropane (boiling point of 295° C.), 2-pyrrolidone (boiling point of 245° C.), tripropylene glycol monomethyl ether (boiling point of 243° C.), and triethylene glycol monomethyl ether (boiling point of 248° C.).

(Surfactant)

The first ink may contain at least one kind of surfactant.

Examples of the surfactant include a nonionic surfactant, a cationic surfactant, an anionic surfactant, and a betaine surfactant.

Preferred examples of the surfactant include an acetylene glycol-based surfactant, which is a kind of a nonionic surfactant.

As the acetylene glycol-based surfactant, for example, the acetylene glycol-based surfactants described in paragraphs 0070 to 0080 of WO2017/149917A can be used.

Examples of the acetylene glycol-based surfactant include a polyalkylene oxide adduct (preferably a polyethylene oxide adduct) of 2,4,7,9-tetramethyl-5-decyne-4,7-diol, a polyalkylene oxide adduct (preferably a polyethylene oxide adduct) of 3,6-dimethyl-4-octyne-3,6-diol, a polyalkylene oxide adduct (preferably a polyethylene oxide adduct) of 2,5,8,11-tetramethyl-6-dodecyne-5,8-diol, and a polyalkylene oxide adduct (preferably a polyethylene oxide adduct) of 2,5-dimethyl-3-hexyne-2,5-diol.

Examples of commercially available products of the acetylene glycol-based surfactant include the SURFYNOL Series (such as SURFYNOL 420, SURFYNOL 440, SURFYNOL 465, and SURFYNOL 485), OLFINE Series (such as OLFINE E1010 and OLFINE E1020), and DYNOL Series (such as DYNOL 604) (all manufactured by Air Products and Chemicals Inc. or Nissin Chemical Co., Ltd.), and ACETYLENOL (manufactured by Kawaken Fine Chemicals Co., Ltd.).

Commercially available products of the acetylene glycol-based surfactants are also provided by The Dow Chemical Company, General Aniline & Film Corporation, and the like.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

In a case where the first ink contains a surfactant, the content of the surfactant in the first ink is appropriately adjusted in consideration of the surface tension of the first ink.

The content of the surfactant in the first ink is preferably in a range of 0.01% by mass to 5% by mass, more preferably in a range of 0.05% by mass to 3% by mass, and still more preferably in a range of 0.1% by mass to 2% by mass with respect to the total amount of the first ink.

(Silicic Acid Compound)

The first ink may contain at least one silicic acid compound.

In a case where the first ink contains a silicic acid compound, the jetting stability of the first ink from an ink jet head can be further improved.

As the silicic acid compound, for example, the compounds described in paragraphs 0058 to 0075 of JP5430316B can be used.

As the silicic acid compound, a silicate (such as sodium silicate, potassium silicate, calcium silicate, magnesium silicate, or an ammonium salt of silicic acid) or silicic anhydride (silica) is preferable, silica is more preferable, and colloidal silica is still more preferable.

As the colloidal silica, a commercially available product may be used.

Specific examples of the commercially available product include SNOWTEX S, SNOWTEX XS, SNOWTEX 20, SNOWTEX 30, SNOWTEX 40, SNOWTEX N, SNOWTEX C, and SNOWTEX O (all manufactured by Nissan Chemical Corporation).

The content of the silicic acid compound in the first ink is preferably in a range of 0.0001% by mass to 1% by mass, more preferably in a range of 0.0005% by mass to 0.5% by mass, still more preferably in a range of 0.001% by mass to 0.5% by mass, and even still more preferably in a range of 0.01% by mass to 0.3% by mass with respect to the total amount of the first ink.

(Other Components)

The first ink may contain other components in addition to the components described above.

Examples of other components include known additives such as urea, a urea derivative, a wax, a fading inhibitor, an emulsion stabilizer, a penetration enhancer, an ultraviolet absorbing agent, a preservative, a fungicide, a pH adjuster, an antifoaming agent, a viscosity adjuster, a dispersion stabilizer, and a chelating agent.

(Preferable Physical Properties of First Ink)

The viscosity (25° C.) of the first ink is preferably 1.2 mPa·s or greater and 15.0 mPa·s less, more preferably 2 mPa·s or greater and less than 13 mPa·s, and still more preferably 2.5 mPa·s or greater and less than 10 mPa·s.

The viscosity in the present disclosure is a value measured at 25° C. using a viscometer unless otherwise specified.

As the viscometer, for example, a VISCOMETER TV-22 type viscometer (manufactured by Toki Sangyo Co., Ltd.) is used.

The surface tension (25° C.) of the first ink is preferably in a range of 25 mN/m to 50 mN/m, more preferably in a range of 30 mN/m to 45 mN/m, and still more preferably in a range of 30 mN/m to 40 mN/m.

The surface tension in the present disclosure is a value measured at a temperature of 25° C. unless otherwise specified.

The surface tension can be measured using, for example, an Automatic Surface Tentiometer CBVP-Z (manufactured by Kyowa Interface Science Co., Ltd.).

The pH of the first ink at 25° C. is preferably in a range of 6 to 11, more preferably in a range of 7 to 10, and still more preferably in a range of 7 to 9.

The pH of the first ink at 25° C. is measured using a commercially available pH meter.

<Step of Preparing Second Ink>

The step of preparing the second ink (hereinafter, also referred to as "second ink preparing step") is a step of preparing the second ink containing a white colorant and water.

The second ink preparing step may be a step of simply preparing the second ink that has been produced in advance or a step of producing the second ink.

A white ink is preferable as the second ink.

The concept of the image recording method of the present disclosure includes an aspect in which two or more kinds of second inks are prepared in the second ink preparing step and the two or more kinds of prepared second inks are applied onto the resin base material in the following applying step in addition to an aspect in which one kind of second ink is prepared in the second ink preparing step and the one kind of prepared second ink is applied onto the resin base material in the following applying step.

Specific examples of the aspect of the two or more kinds of second inks include two or more kinds of white inks with different compositions (for example, the kind of the white colorant).

The preferred aspects of the second ink are the same as the preferred aspects of the first ink except that the second ink contains a white colorant.

(White Colorant)

As the white colorant, a white inorganic pigment is preferable.

Examples of the white inorganic pigment include titanium dioxide ($TiO_2$), barium sulfate, calcium carbonate, aluminum hydroxide, silica, zinc oxide, zinc sulfide, mica, talc, and pearl. Among the examples of the white inorganic pigment, titanium dioxide, barium sulfate, calcium carbonate, or zinc oxide is preferable, and titanium dioxide is more preferable.

The average primary particle diameter of the white inorganic pigment is, for example, in a range of 150 nm to 400 nm.

In a case where the average primary particle diameter thereof is 150 nm or greater, the covering property is further improved.

In a case where the average primary particle diameter thereof is 400 nm or less, the jettability of the first ink is further improved.

The average primary particle diameter of the white inorganic pigment is preferably in a range of 250 nm to 350 nm and more preferably in a range of 250 nm to 300 nm.

In the present disclosure, the covering property denotes a property of covering the base of the second ink (for example, the resin base material and/or the first ink applied onto the resin base material) with the second ink applied onto the resin base material.

The average primary particle diameter of the white inorganic pigment is a value measured using a transmission electron microscope (TEM). A transmission electron microscope 1200EX (manufactured by JEOL Ltd.) can be used for the measurement.

Specifically, the average primary particle diameter is defined as a value obtained by adding the ink diluted to 1000 times dropwise to Cu200 mesh (manufactured by JEOL Ltd.) to which a carbon film has been attached, drying the ink, measuring the equivalent circle diameters of 300 independent particles that do not overlap each other in the image enlarged at a magnification of 100000 times using a TEM, and simply averaging the measured values.

The content of the white colorant is preferably in a range of 1% by mass to 20% by mass, more preferably in a range of 1% by mass to 15% by mass, and still more preferably in a range of 1% by mass to 10% by mass with respect to the total amount of the second ink.

The content of the white colorant is preferably 50% by mass or greater, more preferably 70% by mass or greater, and still more preferably 90% by mass or greater with respect to the total amount of the colorant of the second ink.

<Applying Step>

The applying step is a step of applying each of the first ink and the second ink onto the resin base material by an ink jet method.

(Resin Base Material)

The resin base material is not particularly limited, and examples thereof include a base material containing a thermoplastic resin.

Examples of the resin base material include a base material obtained by molding a thermoplastic resin in the form of a sheet or film.

As the resin base material, a base material containing polypropylene, polyethylene terephthalate, nylon, polyethylene, or polyimide is preferable.

The resin base material may be a transparent resin base material.

Here, the term "transparent" indicates that the transmittance of visible light having a wavelength of 400 nm to 700 nm is 80% or greater (preferably 90% or greater).

In a case where a transparent resin base material is used as the resin base material, the image can be visually recognized from a side of the image non-recorded surface (that is, the surface on which the image has not been recorded) of the resin base material.

The resin base material may be colored.

The shape of the resin base material is not particularly limited.

As the shape of the resin base material, a sheet-shaped resin base material is preferable. From the viewpoint of the productivity of a medium to be recorded, a sheet-shaped resin base material which is capable of forming a roll by being wound is more preferable.

The thickness of the resin base material is preferably in a range of 10 μm to 200 and more preferably in a range of 10 μm to 100 μm.

The resin base material may be subjected to a surface treatment from the viewpoint of improving the surface energy.

Examples of the surface treatment include a corona treatment, a plasma treatment, a flame treatment, a heat treatment, an abrasion treatment, and a light irradiation treatment (UV treatment), but the present invention is not limited thereto.

(Ink Jet Method)

The method of jetting the ink (that is, the first ink and the second ink, the same applies hereinafter) using the ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; and a thermal ink jet (bubble jet (registered trademark)) method of heating an ink to form air bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, as an ink jet method, the method described in paragraphs 0093 to 0105 of JP2003-306623A can also be employed.

The application of the ink according to the ink jet method is performed by allowing a nozzle of an ink jet head to jet the ink.

Examples of the system of the ink jet head include a shuttle system of performing recording while scanning a short serial head in the width direction of a medium to be recorded and a line system of using a line head in which recording elements are aligned in correspondence with the entire area of one side of a medium to be recorded.

In the line system, image recording can be performed on the entire surface of the medium to be recorded by scanning the medium to be recorded in a direction intersecting the direction in which the recording elements are aligned. In the line system, a transport system such as a carriage that scans a short head in the shuttle system is not necessary. Further, in the line system, since movement of a carriage and complicated scanning control between the head and the medium to be recorded are not necessary as compared with the shuttle system, only the medium to be recorded moves. Therefore, according to the line system, image recording at a higher speed than that of the shuttle system can be realized.

It is preferable to apply the ink using an ink jet head having a resolution of 300 dpi or greater (more preferably 600 dpi and still more preferably 800 dpi). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pL (pico liter) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

(Application Disposition of First Ink and Second Ink)

In the applying step, the application disposition of the first ink and the second ink is not particularly limited.

In the applying step, the first ink and the second ink may be applied onto the resin base material in a disposition where an overlapping region is generated or in a disposition where no overlapping region is generated (that is, separate regions are generated).

In general, in a case where the first ink and the second ink are applied onto the resin base material in a disposition where an overlapping region is generated and the first ink and the second ink applied onto the resin base material are dried only by warm air drying, the ink disposed on the lower layer side in the overlapping region (that is, the ink applied first) may be insufficiently dried, and thus the adhesiveness of the image may be decreased.

Further, in general, in a case where the first ink and the second ink are applied onto the resin base material in a disposition where an overlapping region is generated and the first ink and the second ink applied onto the resin base material are dried only by infrared drying, the second ink in the overlapping region may be insufficiently dried, and thus the adhesiveness of the image may be decreased.

However, in the image recording method of the present disclosure, the first ink and the second ink can be applied onto the resin base material in a disposition where an overlapping region is generated. Even in this aspect, drying of the ink disposed on the lower layer side (the first ink or the second ink) is promoted by the microwave drying in the drying step, and drying of the second ink is promoted. As a result, the adhesiveness of the image is improved.

Therefore, in the image recording method of the present disclosure, it is preferable that the first ink and the second ink are applied onto the resin base material in a disposition where an overlapping region is generated from the viewpoint that the improvement range of the adhesiveness is further increased by microwave drying as compared with the case where the first ink and the second ink are applied in a disposition where no overlapping region is generated.

(Order of Applying First Ink and Second Ink)

In the applying step, the order of applying the first ink and the second ink is not particularly limited.

For example, in case where the first ink and the second ink are applied onto the resin base material in a disposition where an overlapping region is generated, the ink applied first in the overlapping region (that is, the ink disposed on the lower layer side in the overlapping region) may be the first ink or the second ink.

In other words, the applying step may be carried out according to any of the following aspect A or the following aspect B.

The aspect A is an aspect in which the first ink is applied first in the overlapping region, and more specifically, the first ink is applied onto the resin base material and the second ink is applied onto at least a part of the applied first ink. The aspect A may be an aspect in which the first ink applied onto the resin base material is dried and the second ink is applied onto the at least a part of the dried first ink. In this case, the method of drying the first ink is not particularly limited.

The aspect B is an aspect in which the second ink is applied first in the overlapping region, and more specifically, the second ink is applied onto the resin base material and the first ink is applied onto at least a part of the applied second ink. The aspect B may be an aspect in which the second ink applied onto the resin base material is dried and the first ink is applied onto at least a part of the dried second ink. In this case, the method of drying the second ink is not particularly limited.

In general, in a case where the aspect A (aspect in which the first ink is applied first) is employed and the first ink and the second ink applied onto the resin base material are dried only by infrared drying, the second ink disposed on the upper layer side in the overlapping region may be insufficiently dried. As a result, in a case where the first ink disposed on the lower layer side is coated with the second ink in a state of being insufficiently dried and disposed on the upper layer side, the first ink disposed on the lower layer side may be insufficiently dried. Therefore, in a case where the first ink and the second ink applied onto the resin base material are dried only by infrared drying, the aspect A (aspect in which the first ink is applied first) may lead to a further decrease in adhesiveness of the image as compared to the aspect B (aspect in which the second ink is applied first).

However, in the image recording method of the present disclosure, since drying of the second ink disposed on the upper layer side is promoted by microwave drying in the drying step even in the aspect A (the aspect in which the first ink is applied first), the adhesiveness of the image is improved.

Therefore, it is preferable that the image recording method of the present disclosure is carried out according to the aspect A (aspect in which the first ink is applied first) from the viewpoint the improvement range of the adhesiveness is further increased by microwave drying as compared with the aspect B (aspect in which the second ink is applied first).

In the image recording method of the present disclosure, specific examples of the embodiment of the aspect A (aspect in which the first ink is applied first) include an embodiment in which the first ink (for example, a color ink and/or a black ink) is applied onto a transparent resin base material in a form of a pattern of characters, figures, or the like and the second ink (for example, a white ink) is applied in a form of a solid to cover the applied first ink.

In such an embodiment, the pattern image formed of the first ink with the solid image formed of the second ink as the background can be visually recognized through the transparent resin base material from a side of the transparent resin base material where the image non-recorded surface (that is, the surface on which no image has been recorded) is provided.

On the contrary, the pattern image formed of the first ink and the transparent resin base material are covered by the solid image formed of the second ink and thus the pattern image and the transparent resin base material are unlikely to be visually recognized in a case where the image and the base material are observed from a side of the transparent resin base material where the image recorded surface (that is, the surface on which the image has been recorded) is provided.

(Total Application Amount of First Ink and Second Ink)

The total application amount of the first ink and the second ink applied onto the resin base material is not particularly limited, but is, for example, in a range of 10 $g/m^2$ to 30 $g/m^2$ and preferably in a range of 15 $g/m^2$ to 26 $g/m^2$.

In the present disclosure, the total application amount of the first ink and the second ink denotes the total of the application amount of the first ink and the application amount of the second ink.

In the present disclosure, in a case where two or more kinds of the first inks are applied onto the resin base material, the application amount of the first ink denotes the total application amount of two or more kinds of the first inks applied onto the resin base material.

In the present disclosure, in a case where two or more kinds of the second inks are applied onto the resin base material, the application amount of the second ink denotes the total application amount of two or more kinds of the second inks applied onto the resin base material.

In the present disclosure, each of the application amount of the first ink and the application amount of the second ink is the application amount (unit: $g/m^2$) in a 100% density portion (that is, a portion to which the ink is applied at a halftone dot rate of 100%).

In a case where the first ink and the second ink are applied in a disposition where an overlapping region is generated, the total application amount of the first ink and the second ink is preferably 15 $g/m^2$ or greater from the viewpoint of further increasing the improvement range of the adhesiveness using microwave drying.

Generally in a case where the drying is performed only by infrared drying and the total application amount of the first ink and the second ink is 15 $g/m^2$ or greater, the first ink and the second ink are unlikely to be dried.

However, in the image recording method according to the embodiment of the present invention, the first ink and the second ink can be efficiently dried by microwave drying.

Therefore, in the image recording method of the present disclosure, in a case where the total application amount of the first ink and the second ink is 15 $g/m^2$ or greater, the improvement range of the adhesiveness is further increased by microwave drying as compared with a case where the total application amount of the first ink and the second ink is less than 15 $g/m^2$.

From the viewpoint of further increasing the improvement range of the adhesiveness using microwave drying, the total application amount of the first ink and the second ink is more preferably 16 $g/m^2$ or greater and still more preferably 17 $g/m^2$ or greater.

Meanwhile, from the viewpoint of improving insufficient drying of the first ink and the second ink and reducing a decrease in adhesiveness of the image caused by the insufficient drying in a case where the first ink and the second ink are applied in a disposition where an overlapping region is generated, the total application amount of the first ink and the second ink is preferably 26 $g/m^2$ or less, more preferably 25 $g/m^2$ or less, and still more preferably 24 $g/m^2$.

(Application Amount Ratio [Second Ink/First Ink])

In a case where the ratio of the application amount of the first ink to the application amount of the second ink in terms of mass is set as the application amount ratio [second ink/first ink], the application amount ratio [second ink/first ink] is not particularly limited, but is in a range of 0.2 to 2.0 and preferably in a range of 0.5 to 1.6.

From the viewpoint of further increasing the improvement range of the adhesiveness using microwave drying in a case where the first ink and the second ink are applied in a disposition where an overlapping region is generated, the application amount ratio [second ink/first ink] is preferably 0.5 or greater.

In general, in a case where the drying is performed only by infrared drying and the application amount ratio [second ink/first ink] is 0.5 or greater, particularly the second ink is unlikely to be dried.

However, in the image recording method according to the embodiment of the present invention, the first ink and the second ink can be efficiently dried by microwave drying.

Therefore, in a case where the application amount ratio [second ink/first ink] is 0.5 or greater in the image recording method according to the embodiment of the present invention, the improvement range of the adhesiveness is further increased by microwave drying as compared with a case where the application amount ratio [second ink/first ink] is less than 0.5.

From the viewpoint of further increasing the improvement range of the adhesiveness using microwave drying, the application amount ratio [second ink/first ink] is more preferably 0.6 or greater and still more preferably 0.7 or greater.

Meanwhile, from the viewpoint of further improving insufficient drying of the second ink and further reducing a decrease in adhesiveness of the image caused by the insufficient drying in the case where the first ink and the second ink are applied in a disposition where an overlapping region is generated, the application amount ratio [second ink/first ink] is preferably 1.6 or less, more preferably 1.5 or less, and still more preferably 1.4 or less.

(Application Amount of Second Ink)

The application amount of the second ink applied is not particularly limited, but is, for example, in a range of 4 $g/m^2$ to 20 $g/m^2$ and preferably in a range of 5 $g/m^2$ to 16 $g/m^2$.

From the viewpoint of further increasing the improvement range of the adhesiveness using microwave drying in the case where the first ink and the second ink are applied in a disposition where an overlapping region is generated, the application amount of the second ink is preferably 5 $g/m^2$ or greater.

Generally, in a case where the drying is performed only by infrared drying and the application amount of the second ink is 5 $g/m^2$ or greater, the second ink is unlikely to be dried.

However, in the image recording method according to the embodiment of the present invention, the first ink and the second ink can be efficiently dried by microwave drying.

Therefore, in the image recording method according to the embodiment of the present invention, in a case where the application amount of the second ink is 5 $g/m^2$ or greater, the improvement range of the adhesiveness is further increased by microwave drying as compared with a case where the application amount of the second ink is less than 5 g/m².

From the viewpoint of further increasing the improvement range of the adhesiveness using microwave drying, the application amount of the second ink is more preferably 6 g/m² or greater and still more preferably 7 g/m² or greater.

Meanwhile, from the viewpoint of further improving insufficient drying of the second ink and further reducing a decrease in adhesiveness of the image caused by the insufficient drying in the case where the first ink and the second ink are applied in a disposition where an overlapping region is generated, the application amount of the second ink is preferably 16 g/m² or less, more preferably 15 g/m² or less, and still more preferably 14 g/m² or less.

<Drying Step>

The drying step is a step of drying the first ink and the second ink applied onto the resin base material to obtain an image and includes irradiating the first ink and the second ink applied onto the resin base material with microwaves (that is, microwave drying).

The first ink and the second ink applied onto the resin base material can be efficiently dried entirely over the inside and the surface of the ink by microwave drying. In a case where the first ink and the second ink are applied in a disposition where an overlapping region is generated in the applying step, both the ink applied on the upper layer side in the overlapping region and the ink applied on the lower layer side in the overlapping region can be efficiently dried by microwave drying. From the above-described viewpoint, the microwave drying is advantageous over warm air drying.

Further, not only the first ink but also the second ink that is unlikely to be dried by infrared drying can be efficiently dried by microwave drying. From this viewpoint, microwave drying is advantageous over infrared drying.

(Microwave)

In the present disclosure, the microwave denotes a radio wave with a frequency band of 300 MHz to 30 GHz.

The irradiation with microwaves in the present disclosure can be carried out by using a known microwave heater. The concept of "microwave heater" in the present disclosure also includes a microwave heating furnace.

The irradiation amount of microwaves in the drying step is preferably in a range of 5 kWs to 350 kWs, more preferably in a range of 8 kWz to 320 kWz, and still more preferably in a range of 10 kWz to 300 kWz.

In a case where the irradiation amount of the microwaves is 5 kWs or greater, the drying properties of the first ink and the second ink are further improved. From the viewpoint of further improving the drying properties of the first ink and the second ink, the irradiation amount of the microwaves is more preferably 8 kWs or greater, still more preferably 10 kWs or greater, even still more preferably 30 kWs or greater, even still more preferably 40 kWs or greater, and particularly preferably 120 kWs or greater.

In a case where the irradiation amount of the microwaves is 350 kWs or less, the deformation of the resin base material is further suppressed. From the viewpoint of further suppressing the deformation of the resin base material, the irradiation amount of the microwaves is more preferably 300 kWs or less, still more preferably 280 kWs or less, even still more preferably 260 kWs or less, and even still more preferably 240 kWs or less.

The time of microwave irradiation in the drying step is preferably in a range of 3 s to 60 s, more preferably in a range of 5 s to 30 s, and still more preferably in a range of 5 s to 20 s.

In a case where the time of microwave irradiation is 3 s or longer, the drying properties of the first ink and the second ink are further improved.

In a case where the time of microwave irradiation is 60 s or shorter, it is advantageous in terms of the speed of image recording.

Here, the time of microwave irradiation corresponds to the time from the start to the end of the microwave irradiation on a liquid droplet X described below that has landed at a specific position on the base material.

The output of microwaves in the drying step is preferably in a range of 0.5 kW to 40 kW, more preferably in a range of 0.8 kW to 32 kW, still more preferably in a range of 1 kW to 24 kW, and even still more preferably in a range of 4 kW to 24 kW.

In a case where the output of microwaves is 0.5 kW or greater, the drying properties of the first ink and the second ink are further improved.

In a case where the output of microwaves is 40 kW or less, the range of choice of the microwave heater is wider.

In the applying step, the time from the time at which the final liquid droplet X among the liquid droplets of the first ink and the liquid droplets of the second ink has landed at a specific position on the base material to the start of irradiation of the liquid droplet X with microwaves is preferably in a range of 1.0 s to 10.0 s, more preferably in a range of 1.5 s to 6.0 s, and still more preferably in a range of 2.0 s to 4.0 s.

From the viewpoint of further improving the drying properties of the first ink and the second ink, it is preferable that the drying step includes blowing warm air to the first ink and the second ink applied onto the resin base material (that is, warm air drying).

The temperature of the warm air in this case is preferably in a range of 30° C. to 110° C., more preferably in a range of 40° C. to 100° C., and still more preferably in a range of 40° C. to 90° C.

In a case where the temperature of the warm air is 30° C. or higher, the drying properties of the first ink and the second ink are further improved.

In a case where the temperature of the warm air is 110° C. or lower, the deformation of the resin base material is further suppressed.

The time of warm air drying is preferably in a range of 3 s to 60 s, more preferably in a range of 5 s to 30 s, and still more preferably in a range of 5 s to 20 s.

The time of warm air drying corresponds to the time from the start of blowing warm air to the end of blowing warm air to the liquid droplet X described below that has been landed at a specific position on the base material.

In a case where warm air drying is performed in the applying step, the time from the time at which the liquid droplet X has landed at a specific position on the base material to the start of blowing warm air to the liquid droplet X is preferably in a range of 1.0 s to 10.0 s, more preferably in a range of 1.5 s to 6.0 s, and still more preferably in a range of 2.0 s to 4.0 s.

The drying step may include irradiating of the first ink and the second ink applied onto the resin base material with infrared rays (that is, infrared drying) within a range where the effects of the image recording method of the present invention are not significantly impaired.

<Step of Applying Pretreatment Liquid>

The image recording method of the present disclosure may include a step of applying a pretreatment liquid containing an aggregating agent and water to the resin base material before the applying step described above.

In a case where the image recording method of the present disclosure includes a step of applying a pretreatment liquid, the first ink and the second ink are applied onto the pretreatment liquid applied onto the resin base material in the applying step described above.

(Water)

The pretreatment liquid contains water.

The content of water is preferably 50% by mass or greater and more preferably 60% by mass or greater with respect to the total amount of the pretreatment liquid.

The upper limit of the content of water depends on the amount of other components, but is preferably 90% by mass or less with respect to the total amount of the pretreatment liquid.

(Aggregating Agent)

A pretreatment liquid containing at least one aggregating agent selected from the group consisting of an organic acid, an organic acid salt, a polyvalent metal compound, and a metal complex is prepared as the pretreatment liquid.

The aggregating agent is a component that aggregates components (for example, the first resin and the second resin) in the ink (that is, a first ink and a second ink, the same applies hereinafter).

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, adipic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, nicotinic acid, and pimelic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as a polyvalent carboxylic acid) is preferable.

As the polyvalent carboxylic acid, a dicarboxylic acid or a tricarboxylic acid is preferable, glutaric acid, malonic acid, succinic acid, adipic acid, pimelic acid, malic acid, maleic acid, fumaric acid, tartaric acid, or citric acid is more preferable, glutaric acid, malonic acid, succinic acid, adipic acid, pimelic acid, malic acid, fumaric acid, tartaric acid, or citric acid is still more preferable, and glutaric acid, malonic acid, succinic acid, adipic acid, or pimelic acid is even still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Organic Acid Salt—

Examples of the organic acid salt include salts of organic acids exemplified above.

Examples of the organic acid salt include organic acid salts containing alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the organic acid salt, an organic acid salt containing an alkaline earth metal is preferable, an organic acid salt containing calcium (such as calcium lactate or calcium acetate), or an organic acid salt containing magnesium (such as magnesium lactate or magnesium acetate) is preferable.

—Polyvalent Metal Compound—

Examples of the polyvalent metal compound include a salt (here, excluding the organic acid salt) containing at least one selected from the group consisting of alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the polyvalent metal compound, a nitrate, a chloride, or a thiocyanate is suitable.

As the polyvalent metal compound, a calcium salt or a magnesium salt of nitric acid, calcium chloride, magnesium chloride, or a calcium salt or a magnesium salt of thiocyanic acid is particularly preferable.

Further, it is preferable that at least a part of the polyvalent metal compound is dissociated into polyvalent metal ions and counter ions in the pretreatment liquid.

—Metal Complex—

As the metal complex, a metal complex including at least one selected from the group consisting of zirconium, aluminum, and titanium as a metallic element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

The content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

(Resin)

It is preferable that the pretreatment liquid contains at least one resin.

In a case where the pretreatment liquid contains a resin, the adhesiveness of the image is further improved.

In the case where the pretreatment liquid contains a resin, the glass transition temperature (Tg) of the resin contained in the pretreatment liquid is preferably 0° C. or higher, more preferably 10° C. or higher, still more preferably 20° C. or higher, and even still more preferably 30° C. or higher.

In the case where the pretreatment liquid contains a resin, the glass transition temperature (Tg) of the resin contained in the pretreatment liquid is preferably 120° C. or lower, more preferably 100° C. or lower, still more preferably 80° C. or lower, and even still more preferably 70° C. or lower.

In the present disclosure, the glass transition temperature of the resin indicates a value measured using differential scanning calorimetry (DSC).

Specifically, the glass transition temperature is measured in conformity with the method described in JIS K 7121 (1987) or JIS K 6240 (2011).

The glass transition temperature in the present disclosure is an extrapolated glass transition start temperature (hereinafter, also referred to as Tig).

The method of measuring the glass transition temperature will be described in more detail.

In a case where the glass transition temperature is acquired, the resin is maintained at a temperature lower than the expected glass transition temperature of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature in the present disclosure is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, in a case where the pretreatment liquid contains two or more kinds of resins, the glass transition temperature (Tg) of the resins in the pretreatment liquid indicates the weighted average value of the glass transition temperatures of the respective resins.

Examples of the resin that may be contained in the pretreatment liquid include an acrylic resin, a polyester resin, a polyolefin resin, a polyurethane resin, a polyurea resin, a polyamide resin, a polycarbonate resin, and a polystyrene resin.

The resins that can be contained in the pretreatment liquid include preferably a polyester resin or an acrylic resin and more preferably a polyester resin.

The resin that can be contained in the pretreatment liquid may be a water-soluble resin or a water-insoluble resin, but a water-insoluble resin is preferable.

It is preferable that the pretreatment liquid contains resin particles.

It is preferable that the resin particles consist of a water-insoluble resin.

Further, acrylic resin particles, polyester resin particles, a mixture of acrylic resin particles and polyester resin particles, or composite particles containing an acrylic resin and a polyester resin are preferable as the resin particles.

The resin particles that can be contained in the first ink, which will be described below in the section of "step of preparing first ink" are also preferable as the resin particles.

The weight-average molecular weight (Mw) of the resin in the resin particles is preferably in a range of 1000 to 300000, more preferably in a range of 2000 to 200000, and still more preferably in a range of 5000 to 100000.

In the present disclosure, the weight-average molecular weight (Mw) indicates a value measured according to gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 mL/min, a sample injection volume of 10 μL, and a measurement temperature of 40° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The volume average particle diameter of the resin particles is preferably in a range of 1 nm to 300 nm, more preferably in a range of 3 nm to 200 nm, and still more preferably in a range of 5 nm to 150 nm.

In a case of preparing the pretreatment liquid, a commercially available product of an aqueous dispersion liquid of resin particles may be used.

Examples of the commercially available product of an aqueous dispersion liquid of resin particles include PESRESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, and PLASCOAT Z690 (all manufactured by Goo Chemical Co., Ltd.), VYLONAL MD1200 (manufactured by Toyobo Co., Ltd.), and EM57DOC (manufactured by Daicel Fine-Chem Ltd.).

In a case where the pretreatment liquid contains resin particles, the content of the resin particles is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

(Water-Soluble Organic Solvent)

It is preferable that the pretreatment liquid contains at least one water-soluble organic solvent.

As the water-soluble organic solvent, known solvents can be used without particular limitation.

Examples of the water-soluble organic solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and alkyl alcohols having 1 to 4 carbon atoms, glycol ethers, 2-pyrrolidone, and N-methyl-2-pyrrolidone.

Among these, from the viewpoint of suppressing transfer of components, polyhydric alcohol or polyhydric alcohol ether is preferable, and alkanediol, polyalkylene glycol, or polyalkylene glycol ether is more preferable.

In a case where the pretreatment liquid contains a water-soluble organic solvent, the content of the water-soluble organic solvent is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

As the water-soluble organic solvent that can be contained in the pretreatment liquid, a water-soluble organic solvent having a boiling point of lower than 220° C. is also preferable.

From the viewpoint of the drying properties of the pretreatment liquid, it is preferable that the pretreatment liquid does not contain an organic solvent having a boiling point of 220° C. or higher or the content of the organic solvent having a boiling point of 220° C. or higher is 5% by mass or less (more preferably 3 mass % or less, still more preferably 1 mass % or less) with respect to the total amount of the pretreatment liquid.

As specific examples of each of the water-soluble organic solvent having a boiling point of less than 220° C. and the organic solvent having a boiling point of 220° C. or higher, the section of "step of preparing first ink" described below can be referred to.

(Other Components)

The pretreatment liquid may contain other components in addition to the above-described components as necessary.

Examples of other components that may be contained in the pretreatment liquid include known additives such as a surfactant, a solid wetting agent, a silicic acid compound (such as colloidal silica), an inorganic salt, a fading inhibitor, an emulsion stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

As other components that can be contained in the pretreatment liquid, components that can be contained in the first ink, described below, can also be referred to.

(Physical Properties of Pretreatment Liquid)

From the viewpoint of the aggregation rate of the ink, the pH of the pretreatment liquid at 25° C. is preferably in a range of 0.1 to 3.5.

In a case where the pH of the pretreatment liquid is 0.1 or greater, the roughness of the resin base material is further decreased and the adhesiveness of the image area is further improved.

In a case where the pH of the pretreatment liquid is 3.5 or less, the aggregation rate is further improved, coalescence of dots (ink dots) caused by the ink on the surface of the resin base material is further suppressed, and the roughness of the image is further decreased.

The pH of the pretreatment liquid at 25° C. is more preferably in a range of 0.2 to 2.0.

In the case where the pretreatment liquid contains an aggregating agent, from the viewpoint of the aggregation rate of the ink, the viscosity of the pretreatment liquid is preferably in a range of 0.5 mPa·s to 10 mPa·s and more preferably in a range of 1 mPa·s to 5 mPa·s.

The surface tension of the pretreatment liquid is preferably 60 mN/m or less, more preferably in a range of 20 mN/m to 50 mN/m, and still more preferably in a range of 30 mN/m to 45 mN/m.

EXAMPLES

Hereinafter, examples of the present disclosure will be described below, but the present disclosure is not limited to the following examples.

Hereinafter, "%" and "part" respectively indicate "% by mass" and "part by mass" unless otherwise specified.

"Water" denotes ion exchange water.

<Preparation of Pretreatment Liquid 1>

The components having the following composition were mixed to prepare a pretreatment liquid 1.

—Composition of Pretreatment Liquid 1—
Glutaric acid (manufactured by FUJIFILM Wako Pure Chemical Corporation; aggregating agent (organic acid)): 4% by mass
Resin particles PC1 shown below (Tg of 55° C.): 5% by mass as solid content of resin particles PC1 shown below
1,2-Propanediol (manufactured by FUJIFILM Wako Pure Chemical Corporation; water-soluble organic solvent): 10% by mass
Water: remaining amount set such that total amount of composition was 100% by mass —Preparation of Aqueous Dispersion Liquid of Resin Particles PC1 (Tg of 55° C.)—

Eastek 1100 (manufactured by Eastman Chemical Company) was prepared as an aqueous dispersion liquid of the resin particles PC1 (polyester resin particles) (Tg of 55° C.).

<Preparation of First Ink and Second Ink>

Inks 1A to 1C as the first inks and an ink 2A as the second ink were respectively prepared.

The ink 1A is a black ink, the ink 1B is a cyan ink, the ink 1C is a yellow ink, and the ink 2A is a white ink.

Hereinafter, the details will be described.

(Preparation of Ink 1A)

The ink 1A as the first ink was prepared in the following manner.

—Synthesis of Pigment Dispersion Resin 1—

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise thereto for 3 hours. After completion of the dropwise addition, the solution was allowed to further react for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours. The obtained reaction solution was reprecipitated twice in a large excess amount of hexane, and the deposited resin was dried. In this manner, 96 g of a pigment dispersion resin 1 which was a benzyl methacrylate/methyl methacrylate/methacrylic acid copolymer (=60/30/10 [mass ratio]) was obtained.

The composition of the obtained pigment dispersion resin 1 was confirmed by $^1$H-NMR, and the weight-average molecular weight (Mw) acquired by GPC in terms of polystyrene was 44600. Further, the acid value acquired by the method described in JIS standard (JISK0070:1992) was 65.2 mgKOH/g.

—Preparation of Pigment Dispersion Liquid K—

C.I. Pigment Black 7 (manufactured by Orion Engineered Carbons LLC) (4 parts) serving as a black pigment, the pigment dispersion resin 1 (2 parts) obtained in the above-described manner, methyl ethyl ketone (42 parts), a 1N NaOH aqueous solution (5.5 parts), and water (87.2 parts) were mixed and dispersed by a beads mill using zirconia beads with a diameter of 0.1 mmφ at 2500 rpm (revolutions per minute, the same applies hereinafter) for 6 hours. The obtained dispersion liquid was concentrated under reduced pressure at 55° C. until methyl ethyl ketone was sufficiently distilled off, a part of water was further removed, a centrifugal treatment (using a 50 mL centrifuge tube) was performed at 8000 rpm for 30 minutes using a high-speed centrifugal cooler 7550 (manufactured by Kubota Corporation) so that the precipitate was removed, thereby recovering the supernatant.

As described above, a pigment dispersion liquid K containing a resin-coated pigment in which at least a part of the black pigment was coated with the pigment dispersion resin 1 was obtained.

—Preparation of Aqueous Dispersion Liquid of Resin Particles 1 (Tg of 100° C.)—

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution consisting of 336.4 g of methyl methacrylate, 69.6 g of isobornyl methacrylate, 116.0 g of 2-ethylhexyl methacrylate, 58 g of methacrylic acid, 108 g of methyl ethyl ketone, and 2.32 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant rate such that the dropwise addition was completed in 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1): A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a methyl methacrylate/isobornyl methacrylate/2-ethylhexyl methacrylate/methacrylic acid (=58/12/20/10 [mass ratio]) copolymer.

The weight-average molecular weight (Mw) of the copolymer was 35000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L NaOH aqueous solution were added to the solution, and the temperature of the liquid in the reaction container was increased to 70° C.

Next, 380 g of water was added dropwise to the solution which had been heated to 70° C., at a speed of 10 mL/min, to carry out aqueous dispersion (dispersion step).

Thereafter, the isopropanol, the methyl ethyl ketone, and the water in a total amount of 287.0 g were distilled off by maintaining the temperature of the liquid in the reaction container at 70° C. for 1.5 hours under reduced pressure (solvent removal step). 0.278 g (440 mass ppm as benzisothiazolin-3-one as the solid content of the polymer) of PROXEL GXL (S) (manufactured by Arch Chemicals, Inc.) was added to the obtained liquid.

The obtained liquid was filtered using a filter having a mesh diameter of 1 μm, and the filtrate was collected, thereby obtaining an aqueous dispersion liquid of resin particles 1 whose concentration of solid contents was 26.5% by mass.

The Tg of the resin particles 1 was 100° C., and the volume average particle diameter thereof was 10 nm.

—Preparation of Ink 1A—

An ink 1A having the following composition was prepared using the pigment dispersion liquid K, the aqueous dispersion liquid of the resin particles 1, 1,2-propanediol (hereinafter, also referred to as "PG"; water-soluble organic solvent having a boiling point of lower than 220° C.), a surfactant (OLFINE (registered trademark) E1010, manufactured by Nissin Chemical Co., Ltd.), colloidal silica (SNOWTEX (registered trademark) XS (solid content of 20% by mass), manufactured by Nissan Chemical Corporation), and water.

—Composition of Ink 1A—

Black pigment: 5% by mass

Pigment dispersion resin 1: 2.5% by mass 1,2-Propanediol (PG; water-soluble organic solvent having a boiling point of lower than 220° C.): 25% by mass Surfactant (OLFINE (registered trademark) E1010, manufactured by Nissin Chemical Co., Ltd.): 1% by mass Resin particles 1: 5% by mass Colloidal silica (SNOWTEX (registered trademark) XS (silica solid content of 20% by mass), manufactured by Nissan Chemical Corporation): 0.06% by mass as silica solid content Water: remaining amount set such that total amount of composition was 100% by mass (Preparation of Inks 1B and 1C)

Each of inks 1B to 1C as the first ink was prepared in the same manner as the preparation of the ink 1A except that the composition of the ink was changed as listed in Table 1.

In Table 1, the cyan pigment is C.I. Pigment Blue 15: 3 (manufactured by Dainichiseika Color & Chemicals Mfg. Co., Ltd.), and the yellow pigment is C.I. Pigment Yellow 74 (manufactured by Dainichiseika Color & Chemicals Mfg. Co., Ltd.).

(Preparation of Ink 2A)

The ink 2A as the second ink was prepared in the following manner.

—Synthesis of Pigment Dispersion Resin 2—

A pigment dispersion resin 2 was synthesized as described below.

The same mass of dipropylene glycol as the total amount of monomers described below was added to a three-neck flask equipped with a stirrer and a cooling pipe and heated to 85° C. in a nitrogen atmosphere.

A solution 1 obtained by mixing 9.1 molar equivalents of stearyl methacrylate, 34.0 molar equivalents of benzyl methacrylate, 31.9 molar equivalents of hydroxyethyl methacrylate, 25.0 molar equivalents of methacrylic acid, and 0.8 molar equivalents of 2-mercaptopropionic acid and a solution 2 obtained by dissolving 1% by mass of t-butylperoxy-2-ethylhexanoate (Perbutyl 0, manufactured by NOF Corporation) with respect to the total amount of the monomers in 20% by mass of dipropylene glycol with respect to the total amount of the monomers were respectively prepared. The solution 1 was added dropwise to the three-neck flask for 4 hours, and the solution 2 was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance ($^1$H-NMR) method.

The obtained reaction solution was heated to 70° C., 20.0 molar equivalents of dimethylethanolamine was added thereto as an amine compound, propylene glycol was added thereto, and the resulting solution was stirred, thereby obtaining a 30 mass % solution of the pigment dispersion resin 2.

The constituent components of the obtained polymer were confirmed by $^1$H-NMR. Further, the weight-average molecular weight (Mw) determined by GPC was 22000.

Further, the mass ratio of respective constitutional units in the pigment dispersion resin 2 (constitutional unit derived from stearyl methacrylate/constitutional unit derived from benzyl methacrylate/constitutional unit derived from hydroxyethyl methacrylate/constitutional unit derived from methacrylic acid) was 20/39/27/14. Here, the mass ratio does not include the mass of dimethylaminoethanol.

—Preparation of Pigment Dispersion Liquid W—

A pigment dispersion liquid W was prepared in the following manner using a Lady Mill model LSG-4U-08 (manufactured by AIMEX Co., Ltd.).

45 parts by mass of titanium dioxide particles (TiO$_2$ particles; average primary particle diameter: 210 nm, trade name: PF-690, manufactured by Ishihara Sangyo Kaisha, Ltd.) as a white pigment (white inorganic pigment), 15 parts by mass of a 30 mass % solution of the pigment dispersion resin 2, and 40 parts by mass of ultrapure water were added to a zirconia container. Further, 40 parts by mass of 0.5 mmφ zirconia beads (Torayceram beads, manufactured by Toray Industries, Inc.) were added thereto and mixed gently using a spatula. The zirconia container containing the obtained mixture was placed in a ball mill, and the mixture was dispersed at a rotation speed of 1000 rpm for 5 hours. After completion of the dispersion, the beads were removed by filtration with a filter cloth, thereby obtaining a pigment dispersion liquid W having a TiO$_2$ concentration of 45% by mass.

—Preparation of Ink 2A—

An ink 2A having the following composition was prepared using the pigment dispersion liquid W, the aqueous dispersion liquid of the resin particles 3, 1,2-propanediol (PG; water-soluble organic solvent having a boiling point of lower than 220° C.), a surfactant (OLFINE (registered trademark) E1010, manufactured by Nissin Chemical Co., Ltd.), colloidal silica (SNOWTEX (registered trademark) XS (solid content of 20% by mass), manufactured by Nissan Chemical Corporation), and water.

—Composition of Ink 2A—

White pigment (TiO$_2$): 8% by mass
Pigment dispersion resin 2: 0.8% by mass
1,2-Propanediol (PG; water-soluble organic solvent having a boiling point of lower than 220° C.): 25% by mass
Surfactant (OLFINE (registered trademark) E1010, manufactured by Nissin Chemical Co., Ltd.): 1% by mass
Resin particles 1: 5% by mass
Colloidal silica (SNOWTEX (registered trademark) XS (silica solid content of 20% by mass), manufactured by Nissan Chemical Corporation): 0.06% by mass as silica solid content
Water: remaining amount set such that total amount of composition was 100% by mass

TABLE 1

|  | First ink | | | Second ink |
| --- | --- | --- | --- | --- |
|  | Ink 1A | Ink 1B | Ink 1C | Ink 2A |
| Black pigment | 5 | | | |
| Cyan pigment | | 3 | | |
| Yellow pigment | | | 4 | |
| White pigment | | | | 8 |
| Pigment dispersion resin 1 | 2.5 | 1.5 | 2 | |
| Pigment dispersion resin 2 | | | | 0.8 |
| PG | 25 | 25 | 25 | 25 |
| OLFINE E1010 | 1 | 1 | 1 | 1 |
| Resin particles 1 | 5 | 5 | 5 | 5 |
| SNOTEX XS | 0.06 | 0.06 | 0.06 | 0.06 |
| Water | Remaining amount | Remaining amount | Remaining amount | Remaining amount |

Examples 1 to 5

The pretreatment liquid, the first ink, and the second ink were used in the combinations listed in Table 2, and the image recording and evaluation described below were performed.

<Image Recording ("Without" Overlapping Region)>

A polyethylene terephthalate (PET) base material ("FE2001", manufactured by Futamura Chemical Co., Ltd., thickness of 12 width of 540 mm, length of 4000 m) was prepared as a resin base material (hereinafter, also simply referred to as "base material") on which an image was recorded.

An image recording device including a transport mechanism for transporting a base material, a wire bar coater for applying a pretreatment liquid, a first ink jet head for applying the first ink, a second ink jet head for applying the second ink, and a drying unit including a microwave heater was prepared.

In the image recording device, the wire bar coater, the first ink jet head, the second ink jet head, and the drying unit are disposed in order from the upstream side of the base material in the transport direction.

As both the first ink jet head and the second ink jet head, 1200 dpi/20 inch-width piezo full line heads were used. Here, dpi is an abbreviation for dot per inch.

Both the first ink jet head and the second ink jet head were arranged such that the arrangement direction of nozzles was inclined by 75.7° with respect to a direction (that is, the width direction of the base material) orthogonal to the transport direction of the base material.

A liquid-repellent film containing a fluorine compound was provided on the ink jetting surface of each of the ink jet heads (that is, the first ink jet head and the second ink jet head). The liquid-repellent film containing a fluorine compound is a monolayer (SAM film) of $C_8F_{17}C_2H_4SiCl_3$.

As the microwave heater, a belt transport type microwave continuous heating furnace (manufactured by Micro Denshi Co., Ltd.) which can radiate microwaves having a frequency of 2.45 GHz was used. This microwave heater includes a microwave generator and a warm air generator.

The base material, the pretreatment liquid, the first ink, and the second ink were set in the image recording device.

The pretreatment liquid was applied onto the base material using a wire bar coater while the base material was moved at a constant speed of 500 mm/sec. The application amount of the pretreatment liquid was 1.5 g/m².

The drying of the pretreatment liquid was started at a site where the application of the pretreatment liquid was completed, under a temperature condition of 50° C. using a dryer 1.5 seconds after the completion of the application of the pretreatment liquid to the site, and the drying was completed 3.5 seconds after the completion of the application of the pretreatment liquid. The drying time here was 2 seconds.

While the base material in which the pretreatment liquid had been completely dried was allowed to move at a constant stage speed of 50 mm/sec, the first ink was jetted from the first ink jet head onto the dried pretreatment liquid to be applied in the form of a solid image, and the second ink was jetted from the second ink jet head onto a region of the dried pretreatment liquid where the first ink had not been applied to be applied in the form of a solid image. That is, the jetting was carried out such that the overlapping region between the first ink and the second ink was not generated.

Here, the application amount of each of the first ink and the second ink was set as listed in Table 2. Here, both the first ink and the second ink were allowed to be jetted under the conditions of a jetting frequency of 24 kHz and a resolution of 1200 dpi×1200 dpi (dot per inch).

Next, the first ink and the second ink were dried (drying step) by irradiating the first ink and the second ink applied onto the base material with microwaves using a microwave heater (that is, microwave drying).

The microwave irradiation conditions (specifically, the output, the irradiation time, and the irradiation amount of microwaves) were as listed in Table 2.

The time from the time at which the final liquid droplet X among the liquid droplets of the first ink and the liquid droplets of the second ink had landed at a specific position on the base material to the start of irradiation of the liquid droplet X with microwaves was adjusted to be in a range of 2.0 s to 4.0 s.

In this manner, an image recorded material was obtained by recording each of a solid image formed of the first ink and a solid image formed of the second ink on the base material (specifically, on the dried pretreatment liquid).

<Evaluation>

The above-described image recorded materials were evaluated as follows.

The results are listed in Table 2.

(Deformation of Base Material)

The width of the image recorded material was measured, and the amount of a change from the width (540 mm) of the base material before the image was recorded was acquired. Based on the obtained results, the deformation of the base material was evaluated according to the following evaluation standards.

In the following evaluation standards, the score at which the deformation of the base material is most suppressed is "5".

—Evaluation Standards (Scores) for Deformation of the Base Material—

5: The amount of a change from the width of the base material before the image was recorded was less than 10 mm.

4: The amount of a change from the width of the base material before the image was recorded was 10 mm or greater and less than 20 mm.

3: The amount of a change from the width of the base material before the image was recorded was 20 mm or greater and less than 30 mm.

2: The amount of a change from the width of the base material before the image was recorded was 30 mm or greater and less than 40 mm.

1: The amount of a change from the width of the base material before the image was recorded was 40 mm or greater.

(Drying Properties of the First Ink)

An OPP film (manufactured by Futamura Chemical Co., Ltd., biaxially oriented polypropylene film (thickness of 40 μm) subjected to a corona discharge treatment as a surface treatment) was laminated on and brought into close contact with the solid image formed of the first ink 5 minutes after the image recording (that is, drying of the first ink and the second ink), and the OPP film was peeled off from the solid image. The state of transfer of the solid image to the OPP film was visually observed, and the drying properties of the first ink were evaluated based on the following evaluation standards.

In the following evaluation standards, the score at which the drying properties of the first ink were most excellent is "5".

—Evaluation Standards (Scores) for Drying Properties of First Ink—

5: Transfer of the solid image was not found at all.

4: Transfer of the solid image was found in less than 5% of the entire solid image.

3: Transfer of the solid image was found in 5% or greater and less than 10% of the entire solid image.

2: Transfer of the solid image was found in 10% or greater and less than 15% of the entire solid image.

1: Transfer of the solid image was found in 15% or greater of the entire solid image.

(Drying Properties of Second Ink)

The drying properties of the second ink were evaluated in the same manner as the evaluation of the drying properties of the first ink except that the operation of laminating an OPP film on the solid image formed of the first ink and bringing the film into close contact with the solid image was changed to an operation of laminating an OPP film on the solid image formed of the second ink and bringing the film into close contact with the solid image.

In the following evaluation standards, the score at which the drying properties of the second ink were most excellent is "5".

(Uniformity of Drying Properties Between First Ink and Second Ink)

The uniformity of the drying properties between the first ink and the second ink was evaluated according to the evaluation standards based on the evaluation results (scores) of the drying properties of the first ink and the evaluation results (scores) of the drying properties of the second ink.

In the following evaluation standards, the score at which the uniformity of the drying properties between the first ink and the second ink was most excellent is "5".

—Evaluation Standards (Scores) for Drying Uniformity Between Inks—
- 5: The absolute value of a difference between the score of the drying properties of the first ink and the score of the drying properties of the second ink was 0.
- 4: The absolute value of a difference between the score of the drying properties of the first ink and the score of the drying properties of the second ink was 1.
- 3: The absolute value of a difference between the score of the drying properties of the first ink and the score of the drying properties of the second ink was 2.
- 2: The absolute value of a difference between the score of the drying properties of the first ink and the score of the drying properties of the second ink was 3.
- 1: The absolute value of a difference between the score of the drying properties of the first ink and the score of the drying properties of the second ink was 4.

Examples 6 to 11

The same operation as in Example 3 was performed except that warm air drying under the conditions for warm air listed in Table 2 was added. Here, in Example 7, the conditions for microwaves were further changed as listed in Table 2.

The results are listed in Table 2.

In these examples, warm air drying was carried out using a warm air generator provided in a microwave heater.

The time from the time at which the final liquid droplet X among the liquid droplets of the first ink and the liquid droplets of the second ink had landed at a specific position on the base material to the start of blowing warm air to the liquid droplet X was adjusted to be in a range of 2.0 s to 4.0 s.

Example 12

The operation was performed in the same manner as in Example 6 except that the first ink and the second ink were directly applied onto the base material without applying the pretreatment liquid.

The results are listed in Table 2.

Examples 13 and 14

The operation was performed in the same manner as in Example 6 except that the kind of the first ink was changed as listed in Table 2.

The results are listed in Table 2.

Comparative Example 1

The same operation as in Example 1 was performed except that the microwave drying was changed to infrared drying under the conditions for infrared rays listed in Table 2.

The results are listed in Table 2.

In Comparative Example 1, an infrared irradiation device (BSG3000/1200, manufactured by Heraeus K. K.) was added to a drying unit in an image recording device, and infrared irradiation was performed using this infrared irradiation device.

The time from the time at which the final liquid droplet X among the liquid droplets of the first ink and the liquid droplets of the second ink had landed at a specific position on the base material to the start of irradiation of the liquid droplet X with infrared rays was adjusted to be in a range of 2.0 s to 4.0 s.

Comparative Example 2

The same operation as in Comparative Example 1 was performed except that warm air drying under the conditions for warm air listed in Table 2 was added.

In Comparative Example 2, a dryer was added to a drying unit in an image recording device, and warm air drying was performed using this dryer.

The results are listed in Table 2.

Comparative Example 3

The same operation as in Comparative Example 2 was performed except that infrared drying was not performed.

The results are listed in Table 2.

Comparative Examples 4 and 5

The same operation as in Comparative Example 3 was performed except that the conditions for warm air were changed as listed in Table 2.

The results are listed in Table 2.

TABLE 2

| | Pre-treatment liquid No. | First ink | | | Second ink | | | Total application amount (first ink + second ink) | Ratio of application amount (second ink/first ink) | Over-lapping region | Conditions for microwaves | | | | Conditions for warm air | | Conditions for infrared rays | | Evaluation results | | | | |
|---|---|---|---|---|---|---|---|---|---|---|---|---|---|---|---|---|---|---|---|---|---|---|---|
| | | Ink No. | Color | Application amount (g/m²) | Ink No. | Color | Application amount (g/m²) | | | | Output (kW) | Time (s) | Irradiation amount (kWs) | | Temperature (°C) | Time (s) | Output (kW) | Time (s) | Deformation of base material | Drying properties of first ink | Drying properties of second ink | Uniformity of drying properties |
| Example 1 | 1 | 1A | K | 10 | 2A | W | 10 | 20 | 1.0 | Absent | 0.8 | 10 | 8 | | — | — | — | — | 5 | 3 | 3 | 5 |
| Example 2 | 1 | 1A | K | 10 | 2A | W | 10 | 20 | 1.0 | Absent | 4 | 10 | 40 | | — | — | — | — | 5 | 4 | 4 | 5 |
| Example 3 | 1 | 1A | K | 10 | 2A | W | 10 | 20 | 1.0 | Absent | 12 | 10 | 120 | | — | — | — | — | 5 | 4 | 4 | 5 |
| Example 4 | 1 | 1A | K | 10 | 2A | W | 10 | 20 | 1.0 | Absent | 12 | 20 | 240 | | — | — | — | — | 5 | 4 | 4 | 5 |
| Example 5 | 1 | 1A | K | 10 | 2A | W | 10 | 20 | 1.0 | Absent | 12 | 27 | 324 | | — | — | — | — | 4 | 5 | 5 | 5 |
| Example 6 | 1 | 1A | K | 10 | 2A | W | 10 | 20 | 1.0 | Absent | 12 | 5 | 60 | | 60 | 10 | — | — | 5 | 5 | 5 | 5 |
| Example 7 | 1 | 1A | K | 10 | 2A | W | 10 | 20 | 1.0 | Absent | 12 | 10 | 120 | | 60 | 10 | — | — | 5 | 4 | 4 | 5 |
| Example 8 | 1 | 1A | K | 10 | 2A | W | 10 | 20 | 1.0 | Absent | 12 | 10 | 120 | | 30 | 10 | — | — | 5 | 5 | 5 | 5 |
| Example 9 | 1 | 1A | K | 10 | 2A | W | 10 | 20 | 1.0 | Absent | 12 | 10 | 120 | | 40 | 10 | — | — | 5 | 5 | 5 | 5 |
| Example 10 | 1 | 1A | K | 10 | 2A | W | 10 | 20 | 1.0 | Absent | 12 | 10 | 120 | | 100 | 10 | — | — | 5 | 5 | 5 | 5 |
| Example 11 | 1 | 1A | K | 10 | 2A | W | 10 | 20 | 1.0 | Absent | 12 | 10 | 120 | | 110 | 10 | — | — | 4 | 5 | 5 | 5 |
| Example 12 | 1 | 1A | K | 10 | 2A | W | 10 | 20 | 1.0 | Absent | 12 | 10 | 120 | | 60 | 10 | — | — | 5 | 5 | 5 | 5 |
| Example 13 | None | 1B | C | 10 | 2A | W | 10 | 20 | 1.0 | Absent | 12 | 10 | 120 | | 60 | 10 | 5 | 5 | 5 | 5 | 5 | 5 |
| Example 14 | 1 | 1C | Y | 10 | 2A | W | 10 | 20 | 1.0 | Absent | 12 | 10 | 120 | | 60 | 10 | 3 | 10 | 5 | 5 | 5 | 5 |
| Comparative Example 1 | 1 | 1A | K | 10 | 2A | W | 10 | 20 | 1.0 | Absent | — | — | — | | — | — | — | — | 5 | 4 | 1 | 2 |
| Comparative Example 2 | 1 | 1A | K | 10 | 2A | W | 10 | 20 | 1.0 | Absent | — | — | — | | 60 | 10 | 3 | 10 | 5 | 5 | 2 | 2 |
| Comparative Example 3 | 1 | 1A | K | 10 | 2A | W | 10 | 20 | 1.0 | Absent | — | — | — | | 60 | 10 | — | — | 5 | 1 | 1 | 5 |
| Comparative Example 4 | 1 | 1A | K | 10 | 2A | W | 10 | 20 | 1.0 | Absent | — | — | — | | 110 | 10 | — | — | 3 | 2 | 2 | 5 |
| Comparative Example 5 | 1 | 1A | K | 10 | 2A | W | 10 | 20 | 1.0 | Absent | — | — | — | | 130 | 10 | — | — | 1 | 3 | 3 | 5 |

In the colors of the first ink and the second ink in Table 2, K denotes black, C denotes cyan, Y denotes yellow, and W denotes white.

As listed in Table 2, in Examples 1 to 14 in which microwave drying was performed on the first ink and the second ink applied onto the base material, the drying properties of the first ink and the second ink were excellent, the uniformity of the drying properties between the first ink and the second ink was excellent, and the deformation of the base material was suppressed.

On the contrary, in Comparative Examples 1 and 2 in which infrared drying was carried out without performing microwave drying in the drying step, the drying properties of the second ink were degraded, and thus the uniformity of the drying properties between the first ink and the second ink was decreased.

In Comparative Examples 3 and 4 in which warm air drying at a warm air temperature of 60° C. or 110° C. was carried out without performing microwave drying in the drying step, the drying properties of the first ink and the second ink were insufficient.

In Comparative Example 5 in which warm air drying at a warm air temperature of 130° C. was carried out without performing microwave drying in the drying step, the deformation of the base material was significant.

As shown in the results of Examples 8 and 9, it was found that in a case where the drying step further includes warm air drying at a warm air temperature of 40° C. or higher (Example 9), the drying properties of the first ink and the second ink are further improved.

As shown in the results of Examples 10 and 11, it was found that in a case where the temperature of the warm air is 100° C. or lower (Example 10), the deformation of the base material is further suppressed.

As shown in the results of Examples 1 and 2, it was found that in a case where the irradiation amount of microwaves is 10 kWs or greater (Example 2), the drying properties of the first ink and the second ink are further improved.

As shown in the results of Examples 4 and 5, it was found that in a case where the irradiation amount of microwaves is 300 kWs or less (Example 4), the deformation of the base material is further suppressed.

Example 101

The following image recording and evaluation were performed using the pretreatment liquid, the first ink, and the second ink in the combination listed in Table 3.

<Image Recording ("With" Overlapping Region)>

The image recording ("with" overlapping region) was performed in the same manner as in "image recording ("without" overlapping region)" in Example 6 except for the following points. In this manner, a solid image having a laminated structure of "a layer derived from the second ink/a layer derived from the first ink/a layer derived from the pretreatment liquid" was recorded on the resin base material, thereby obtaining an image recorded material.

The application amount of each of the first ink and the second ink was as set as listed in Table 3.

The second ink was applied in the form of a solid to overlap with the first ink applied onto the dried pretreatment liquid. That is, the application was carried out such that an overlapping region between the first ink and the second ink was generated.

<Evaluation>

The above-described image recorded materials were evaluated as follows.

The results are listed in Table 3.

(Deformation of Base Material)

The deformation of the base material was evaluated using the image recorded material in the same manner as the evaluation of the deformation of the base material in Example 1.

(Drying Properties)

The drying properties of the first ink and the second ink were evaluated by the same method as in the evaluation of the drying properties of the first ink in Example 1 using the solid image having a laminated structure in the image recorded material.

(Adhesiveness)

The adhesiveness (adhesiveness to the base material) of the solid image having a laminated structure in the image recorded material was evaluated in the following manner.

Here, in a case where at least one of the drying properties of the first ink on the lower layer side or the drying properties of the second ink on the upper layer side were degraded, the adhesiveness of the solid image having the laminated structure was degraded.

Next, the adhesiveness of the image was evaluated by attaching a piece of Cellotape (registered trademark, No. 405, manufactured by Nichiban Co., Ltd., width of 12 mm, hereinafter, also simply referred to as "tape") onto the solid image 5 minutes after the image recording (that is, drying of the first ink and the second ink) and peeling the piece of tape off from the solid image.

Specifically, the tape was attached and peeled off according to the following method.

The tape was taken out at a constant speed and cut to have a length of approximately 75 mm, thereby obtaining a piece of tape.

The obtained piece of tape was superimposed on the solid image, and a region in the piece of tape at a center with a width of 12 mm and a length of 25 mm was attached onto the image using a finger and rubbed firmly with a fingertip.

An end of the piece of tape was grasped in 5 minutes after the piece of tape was attached onto the image and was peeled off from the image at an angle as close as possible to 60° for 0.5 to 1.0 seconds.

The presence or absence of adhesive matter on the piece of peeled tape and the presence or absence of peeling of the solid image on the base material were visually observed, and the adhesiveness of the image was evaluated according to the following evaluation standards.

The results are listed in Table 3.

In the following evaluation standards, the score at which the adhesiveness is most excellent is "5".

—Evaluation Standards (Scores) for Adhesiveness—

5: Adhesive matter was not found on the piece of tape, and peeling of the solid image on the base material was also not found.

4: A small amount of colored adhesive matter was found on the piece of tape, but peeling of the solid image on the base material was not found.

3: A small amount of colored adhesive matter was found on the piece of tape, and slight peeling of the solid image on the base material was found, but it was in a practically acceptable range.

2: Colored adhesive matter was found on the piece of tape, peeling of the solid image on the base material was also found, and it was out of a practically acceptable range.

1: Colored adhesive matter was found on the piece of tape, and most of the solid image on the base material was peeled off so that the base material was visually recognized.

Examples 102 to 106

The same operation as in Example 101 was performed except that the application amount of the first ink and/or the application amount of the second ink were changed as listed in Table 3.

The results are listed in Table 3.

Comparative Examples 101, 106, and 107

The same operations as in Examples 101 to 103 were performed except that infrared drying was performed under the conditions for infrared rays listed in Table 3 in place of microwave drying and warm air drying.

The infrared drying was carried out in the same manner as in Comparative Example 1.

The results are listed in Table 3.

Comparative Example 102

The same operation as in Comparative Example 101 was performed except that warm air drying under the conditions for warm air listed in Table 3 was added.

Warm air drying was carried out in the same manner as in Comparative Example 2.

The results are listed in Table 3.

Comparative Example 103

The same operation as in Comparative Example 102 was performed except that infrared drying was not performed.

The results are listed in Table 3.

Comparative Examples 104 and 105

The same operation as in Comparative Example 103 was performed except that the conditions for warm air were changed as listed in Table 3.

The results are listed in Table 3.

TABLE 3

| | Pretreatment liquid No. | First ink Ink No. | First ink Color | First ink Application amount (g/m²) | Second ink Ink No. | Second ink Color | Second ink Application amount (g/m²) | Total application amount (first ink + second ink) | Radio of application (second ink/first ink) | Overlapping region | Conditions for microwaves Output (kW) | Conditions for microwaves Time (s) | Conditions for microwaves Irradiation amount (kWs) | Conditions for warm air Temperature (°C.) | Conditions for warm air Time (s) | Conditions for infrared rays Output (kW) | Conditions for infrared rays Time (s) | Deformation of base material | Drying properties | Adhesiveness | Improvement range of adhesiveness |
|---|---|---|---|---|---|---|---|---|---|---|---|---|---|---|---|---|---|---|---|---|---|
| Example 101 | 1 | 1A | K | 10 | 2A | W | 5 | 15 | 0.5 | Present | 12 | 10 | 120 | 60 | 10 | — | — | 5 | 5 | 5 | 3 |
| Example 102 | 1 | 1A | K | 10 | 2A | W | 7 | 17 | 0.7 | Present | 12 | 10 | 120 | 60 | 10 | — | — | 5 | 5 | 5 | 4 |
| Example 103 | 1 | 1A | K | 10 | 2A | W | 14 | 24 | 1.4 | Present | 12 | 10 | 120 | 60 | 10 | — | — | 5 | 5 | 5 | 4 |
| Example 104 | 1 | 1A | K | 10 | 2A | W | 16 | 26 | 1.6 | Present | 12 | 10 | 120 | 60 | 10 | — | — | 5 | 4 | 4 | N.D. |
| Example 105 | 1 | 1A | K | 15 | 2A | W | 10 | 25 | 0.7 | Present | 12 | 10 | 120 | 60 | 10 | — | — | 5 | 5 | 5 | N.D. |
| Example 106 | 1 | 1A | K | 16 | 2A | W | 10 | 26 | 0.6 | Present | 12 | 10 | 120 | 60 | 10 | — | — | 5 | 4 | 4 | N.D. |
| Comparative Example 101 | 1 | 1A | K | 10 | 2A | W | 14 | 24 | 1.4 | Present | — | — | — | — | — | 3 | 10 | 5 | 4 | 1 | — |
| Comparative Example 102 | 1 | 1A | K | 10 | 2A | W | 14 | 24 | 1.4 | Present | — | — | — | 60 | 10 | 3 | 10 | 5 | 5 | 2 | — |
| Comparative Example 103 | 1 | 1A | K | 10 | 2A | W | 14 | 24 | 1.4 | Present | — | — | — | 60 | 10 | — | — | 5 | 1 | 1 | — |
| Comparative Example 104 | 1 | 1A | K | 10 | 2A | W | 14 | 24 | 1.4 | Present | — | — | — | 110 | 10 | — | — | 3 | 2 | 1 | — |
| Comparative Example 105 | 1 | 1A | K | 10 | 2A | W | 14 | 24 | 1.4 | Present | — | — | — | 130 | 10 | — | — | 1 | 3 | 1 | — |
| Comparative Example 106 | 1 | 1A | K | 10 | 2A | W | 5 | 15 | 0.5 | Present | — | — | — | — | — | 3 | 10 | 5 | 4 | 2 | — |
| Comparative Example 107 | 1 | 1A | K | 10 | 2A | W | 7 | 17 | 0.7 | Present | — | — | — | — | — | 3 | 10 | 5 | 4 | 1 | — |

As shown in Table 3, in Examples 101 to 106 in which microwave drying and warm air drying were performed in the case of "with" the overlapping region where the first ink and the second ink were applied, the drying properties of the first ink and the second ink were excellent, the adhesiveness of the solid image was excellent, and the deformation of the base material was suppressed.

On the contrary, in Comparative Examples 101 and 102 in which infrared drying was carried out without performing microwave drying and warm air drying in the drying step, the adhesiveness of the solid image was decreased. The reason for this is considered to be that the drying properties of the second ink disposed on the upper layer side in the overlapping region are degraded and thus the drying properties of the first ink disposed on the lower layer side are degraded due to the degradation of the drying properties of the second ink.

Even in Comparative Examples 103 to 105 in which the warm air drying was performed without performing microwave drying in the drying step, the adhesiveness of the solid image was decreased. The reason for this is considered to be that the drying properties of the first ink disposed on the lower layer side in the overlapping region were degraded.

Further, in Comparative Example 105 in which warm air drying at a warm air temperature of 130° C. was carried out, the deformation of the base material was significant. In Comparative Example 105, the adhesiveness of the solid image was also decreased. The decrease in adhesiveness is considered to be caused by the deformation of the base material.

In Table 3, "improvement range of adhesiveness" denotes the range of improvement of the adhesiveness due to a change of infrared drying to microwave drying.

For example, the improvement range of adhesiveness in Example 101 (that is, "3") denotes the improvement range (that is, "3=5-2") of the adhesiveness of Example 101 (that is, score of 5) with respect to the adhesiveness of Comparative Example 106 (that is, score of 2), the improvement range of adhesiveness in Example 102 (that is, "4") denotes the improvement range (that is, "4=5-1") of the adhesiveness of Example 102 (that is, score of 5) with respect to the adhesiveness of Comparative Example 107 (that is, score of 1), and the improvement range of adhesiveness in Example 103 (that is, "4") denotes the improvement range (that is, "4=5-1") of the adhesiveness of Example 103 (that is, score of 5) with respect to the adhesiveness of Comparative Example 101 (that is, score of 1).

"N. D." in the columns of "improvement range of adhesiveness" denotes that the evaluation of the improvement range of the adhesiveness was not performed due to the absence of the comparative example for comparison.

Examples 101 and 102 are examples in which infrared drying in Comparative Examples 106 and 107 was changed to microwave drying.

As shown in the results of Examples 101 and 102, it was found that in a case where the total application amount of the first ink and the second ink was 16 g/m$^2$ or greater (Example 102), the improvement range of the adhesiveness was further increased due to the change of infrared drying to microwave drying.

As shown in the results of Examples 103 and 104, it was found that in a case where the total application amount of the first ink and the second ink was 25 g/m$^2$ or less (Example 103), the drying properties and the adhesiveness were further improved.

As shown in the results of Examples 101 and 102, it was found that in a case where the application amount ratio [second ink/first ink] was 0.6 or greater (Example 102), the improvement range of the adhesiveness was further increased due to the change of infrared drying to microwave drying.

As shown in the results of Examples 103 and 104, it was found that in a case where the application amount ratio [second ink/first ink] was 1.5 or less (Example 103), the drying properties and the adhesiveness were further improved.

As shown in the results of Examples 101 and 102, it was found that in a case where the application amount of the second ink was 7 g/m$^2$ or greater (Example 102), the improvement range of the adhesiveness was further increased due to the change of infrared drying to microwave drying.

As shown in the results of Examples 103 and 104, it was found that in a case where the application amount of the second ink was 15 g/m$^2$ or less (Example 103), the drying properties and the adhesiveness were further improved.

Hereinbefore, the group of the examples in which one kind of ink was used as the first ink and one kind of ink was used as the second ink has been described above, but the present disclosure is not limited to the group of the examples.

For example, in the group of the examples, it goes without saying that the same effects as the effects of the group of the examples described above can be obtained even in a case where two or more kinds of inks (for example, three kinds of inks which are a cyan ink, a magenta ink, and a yellow ink or four kinds of inks which are the three kinds of inks and a black ink) were used as the first ink and/or two or more kinds of inks (for example, two or more kinds of white inks) were used as the first ink.

What is claimed is:

1. An image recording method comprising:
a step of preparing a first ink containing water and at least one selected from the group consisting of a chromatic colorant and a black colorant;
a step of preparing a second ink containing a white colorant and water;
an applying step of applying each of the first ink and the second ink onto a resin base material by an ink jet method; and
a drying step of including irradiating the first ink and the second ink applied onto the resin base material with microwaves,
wherein an irradiation amount of the microwaves in the drying step is in a range of 60 kWs to 240 kWs.

2. The image recording method according to claim 1,
wherein the drying step further includes blowing warm air at 40° C. to 100° C. onto the first ink and the second ink applied onto the resin base material.

3. The image recording method according to claim 1,
wherein the applying step is a step of applying the first ink and the second ink onto the resin base material in a disposition where an overlapping region is generated.

4. The image recording method according to claim 3,
wherein a total application amount of the first ink and the second ink in the applying step is 16 g/m$^2$ or greater.

5. The image recording method according to claim 3,
wherein a total application amount of the first ink and the second ink in the applying step is 25 g/m$^2$ or less.

6. The image recording method according to claim 3,
wherein a ratio of an application amount of the second ink to an application amount of the first ink in the applying step is 0.6 or greater in terms of mass.

7. The image recording method according to claim 3, wherein a ratio of an application amount of the second ink to an application amount of the first ink in the applying step is 1.5 or less in terms of mass.

8. The image recording method according to claim 3, wherein an application amount of the second ink in the applying step is 7 g/m$^2$ or greater.

9. The image recording method according to claim 3, wherein an application amount of the second ink in the applying step is 15 g/m$^2$ or less.

10. The image recording method according to claim 1, wherein in the applying step, the first ink is applied onto the resin base material, and the second ink is applied onto at least a part of the applied first ink.

* * * * *